(12) United States Patent
Grant et al.

(10) Patent No.: US 12,088,373 B2
(45) Date of Patent: Sep. 10, 2024

(54) METHODS AND SYSTEMS FOR BEAM TRACKING PROCESS MANAGEMENT AND INDICES

(71) Applicant: Telefonaktiebolaget LM Ericsson (publ), Stockholm (SE)

(72) Inventors: Stephen Grant, Pleasanton, CA (US); Mattias Frenne, Uppsala (SE); Eleftherios Karipidis, Stockholm (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 293 days.

(21) Appl. No.: 17/329,970

(22) Filed: May 25, 2021

(65) Prior Publication Data
US 2021/0281305 A1    Sep. 9, 2021

Related U.S. Application Data

(63) Continuation of application No. 15/757,451, filed as application No. PCT/EP2017/078210 on Nov. 3, 2017, now Pat. No. 11,038,570.
(Continued)

(51) Int. Cl.
| | |
|---|---|
| *H04B 7/06* | (2006.01) |
| *H04L 5/00* | (2006.01) |
| *H04W 24/08* | (2009.01) |
| *H04W 24/10* | (2009.01) |
| *H04W 72/23* | (2023.01) |

(52) U.S. Cl.
CPC ......... *H04B 7/0617* (2013.01); *H04B 7/0626* (2013.01); *H04L 5/0051* (2013.01); *H04W 24/08* (2013.01); *H04W 24/10* (2013.01); *H04W 72/23* (2023.01)

(58) Field of Classification Search
CPC .... H04B 7/0617; H04B 7/0626; H04B 7/024; H04L 5/0051; H04W 24/08; H04W 24/10; H04W 72/23
See application file for complete search history.

(56) References Cited

U.S. PATENT DOCUMENTS

| | | | |
|---|---|---|---|
| 2007/0168663 | A1 | 7/2007 | Hirai et al. |
| 2013/0040684 | A1 | 2/2013 | Yu et al. |

(Continued)

FOREIGN PATENT DOCUMENTS

| | | |
|---|---|---|
| CN | 101047495 A | 10/2007 |
| KR | 10-2013-0017562 A | 2/2013 |

(Continued)

OTHER PUBLICATIONS

Japanese Office Action dated Jun. 19, 2020, issued in Japanese Patent Application No. 2019-523764, 2 pages.
(Continued)

*Primary Examiner* — Eric Myers
(74) *Attorney, Agent, or Firm* — Rothwell, Figg, Ernst & Manbeck, P.C.

(57) ABSTRACT

In a multi-BPL scenario, some form of beam-related indication is desirable to provide assistance to the UE in setting its Rx spatial filtering configuration to receive PDSCH. The assistance to the UE is in the form of a certain indicator indicating a spatial QCL assumption between PDSCH DMRS antenna port(s) and DL RS (e.g., CSI-RS) antenna port(s), such as a preferred CSI-RS resource that was measured and reported previously.

20 Claims, 10 Drawing Sheets

Related U.S. Application Data

(60) Provisional application No. 62/520,078, filed on Jun. 15, 2017, provisional application No. 62/417,785, filed on Nov. 4, 2016.

(56) References Cited

U.S. PATENT DOCUMENTS

| | | |
|---|---|---|
| 2013/0065622 A1 | 3/2013 | Hwang |
| 2015/0029966 A1 | 1/2015 | Park et al. |
| 2015/0173064 A1 | 6/2015 | Kim et al. |
| 2015/0382205 A1 | 12/2015 | Lee et al. |
| 2016/0301505 A1 | 10/2016 | Furuskog et al. |
| 2017/0288758 A1 | 10/2017 | Kakishima et al. |
| 2018/0092129 A1 | 3/2018 | Guo et al. |

FOREIGN PATENT DOCUMENTS

| | | |
|---|---|---|
| KR | 10-2015-0035556 A | 4/2015 |
| WO | 2016047505 | 5/2015 |

OTHER PUBLICATIONS

Ericsson, "Beam Management Principles", 3GPP TSG-RAN WG1 Meeting #86bis, R1-1609754, Lisbon, Portugal, Oct. 10-14, 2016, 5 pages.
Written Opinion of the International Preliminary Examining Authority issued in Application No. PCT/EP2017/078210 dated Nov. 12, 2018, 7 pages.
Ericsson, "Key principles for beam management", 3GPP TSG-RAN WG1 Meeting #86, R1-167466, Göteborg, Sweden, Aug. 22-26, 2016, 6 pages.
Nokia Networks, "Beam offloading in FD MIMO", 3GPP TSG RAN WG1 Meeting #82bis, R1-155889, Malmö, Sweden, Oct. 5-9, 2015, 4 pages.
IEEE Standard Association, "ISO/IEC/IEEE Standard for Information technology—Telecommunications and information exchange between systems Local and metropolitan area networks—Specific requirements, Part 11: Wireless LAN Medium Access Control (MAC) and Physical Layer (PHY) Specification, Amendment 3: Enhancements for Very High Throughput in the 60GHz Band", ISO/IEC/IEEE 8802-11:2012/Amd.3:2014 (E), Dec. 28, 2012, 39 pages.
International Search Report and Written Opinion issued in Application No. PCT/EP2017/078210 dated Feb. 1, 2018, 19 pages.
Huawei et al., "Evaluation of the Impact of QCL Assumptions and Discussion on Potential QCL Configurations", 3GPP TSG RAN WG1 Meeting #86, R1-167199, Gothenburg, Sweden, Aug. 22-26, 2016, 8 pages.
Zte et al., "High level views on beam management for NR-MIMO", 3GPP TSGRAN WG1 Meeting #86bis, R1-1608664, Lisbon, Portugal, Oct. 10-14, 2016, 6 pages.
Ericsson, "Analysis of beam indication signalling options", 3GPP TSG-RAN WG1 Meeting #89ah-NR, R1-1711023, Qingdao, China, Jun. 27-30, 2017, 9 pages.
Ericsson, "On the use of SS for beam management", 3GPP TSG-RAN WG1 Meeting #89ah-NR, R1-1711019, Qingdao, China, Jun. 27-30, 2017, 4 pages.
Ericsson, "The QCL framework in NR", 3GPP TST-RAN WG1 Meeting #89ah-NR, R1-1711051, Qingdao, China, Jun. 27-30, 2017, 6 pages.
Nokia et al., "WF on BPL definition", 3GPP TSG RAN WG1 Meeting #88bis, R1-1706641, Spokane, WA, USA, Apr. 3-7, 2017, 2 pages.
Ericsson, "On DL beam indication", 3GPP TSG-RAN WG1 Meeting #88, R1-1702676, Athens, Greece, Feb. 13-17, 2017, 4 pages.
Ericsson, "Beam management overview", 3GPP TSG-RAN WG1 Meeting #88, R1-1702674, Athens, Greece, Feb. 13-17, 2017, 6 pages.
Ericsson, "On DL beam indication", 3GPP TSG-RAN WG1 Meeting #89ah-NR, R1-1711015, Qingdao, China, Jun. 27-30, 2017, 8 pages.

Example configuration framework for beam management

Example of beam management measurements and reports for two different resource settings with beam indication consisting of Index *i* corresponding to Resource Setting 1.

METHODS AND SYSTEMS FOR BEAM TRACKING PROCESS MANAGEMENT AND INDICES

CROSS-REFERENCE TO RELATED APPLICATION

This application is a continuation of U.S. application Ser. No. 15/757,451, filed on Mar. 5, 2018 (status pending) (published as U.S. Patent Publication No. 20200195324 on Jun. 18, 2020), which is a 35 U.S.C. § 371 National Stage of International Patent Application No. PCT/EP2017/078210, filed Nov. 3, 2017, designating the United States and claiming priority to U.S. provisional application No. 62/417,785, filed on Nov. 4, 2016 and 62/520,078, filed on Jun. 15, 2017. The above identified applications and publication are incorporated by this reference herein in their entirety.

TECHNICAL FIELD

Disclosed are embodiments for beam tracking process management in a system using more than one (i.e., a plurality of) transmit beams.

BACKGROUND

The Third Generation Partnership Project (3GPP) has begun work on the development and design of the next generation mobile communications system (the 5G mobile communication system or simply "5G"). 5G will encompass an evolution of today's 4G networks and the addition of a new, globally standardized radio access technology known as "New Radio" (NR).

The large variety of requirements for NR implies that frequency bands at many different carrier frequencies will be needed. For example, low bands will be needed to achieve sufficient coverage and higher bands (e.g. mmW, such as near and above 30 GHz) will be needed to reach the required capacity. At high frequencies the propagation properties are more challenging and high order beamforming at the base station (e.g., eNB or gNB) will be required to reach sufficient link budget. For example, narrow beam transmission and reception schemes may be needed at higher frequencies to compensate for the high propagation loss. For a given communication link, a beam can be applied at the transmission point (TRP) (i.e., a transmit (TX) beam) and a beam can be applied at the user equipment (UE) (i.e., a receive (RX) beam)).

NR will have a beam centric design, which means that the traditional cell concept is relaxed and user equipments (UEs) (i.e., fixed or mobile wireless communication devices) will in many cases be connected to and perform "handover" between narrow beams instead of cells. Hence, 3GPP has agreed to study concepts for handling mobility between beams (both within and between transmission points (TRPs)). As used herein, a TRP may include, for example, a base station or a component of a base station. At higher frequencies, where high-gain beamforming will be needed, each beam will likely be useful only within a small area (i.e., the beam's coverage area) and the link budget outside the coverage area will deteriorate quickly. Hence, a frequent and fast beam switching method is needed to maintain high performance.

SUMMARY

Some embodiments include a beam tracking process index, which can be included in a channel state information reference signal (CSI-RS) configuration, that allows a UE to know which CSI-RS configuration corresponds to which particular beam tracking process (and link), and which is being used by the TRP and/or network. This has the advantage, for example, that the UE can then automatically store the necessary parameters to use for each respective link (e.g., active or monitored link).

Accordingly, in one aspect there is provided a first method performed by a TRP. In one embodiment the first method includes transmitting, from the TRP to a UE, a first beam tracking process index (BTPI) associated with a first link between the TRP and the UE. In some embodiments, the first link between the TRP (102) and the UE (101) is an active link.

In some embodiments, the method further includes transmitting, from the TRP to the UE, a second BTPI associated with a second link between the TRP and the UE. In some embodiments, the second link between the TRP and the UE is a monitored link.

In some embodiments, transmitting the first BTPI comprises transmitting a message comprising the first BTPI and one or more channel state reference signal (CSI-RS) configurations. In some embodiments, transmitting the second BTPI comprises transmitting a second message comprising the second BTPI and one or more CSI-RS configurations.

In some embodiments, the method further includes transmitting, from the TRP to the UE, a message comprising a CSI-RS configuration and the first BTPI associated with the first link.

In some embodiments, transmitting the first BTPI to the UE comprises transmitting to the UE control message for scheduling a PDSCH transmission, wherein the first BTPI is included in the control message, and the method further comprises, prior to transmitting the control message to the UE, transmitting to the UE a trigger message for triggering the UE to perform reference signal, RS, measurements with respect to a set of one or more RS resources. In some embodiments, the trigger message is a report trigger message for triggering the UE to transmit at least one measurement report after performing the RS measurements.

In some embodiments, the method further includes after transmitting the trigger message to the UE and before transmitting the control message to the UE, transmitting to the UE a message comprising the BTPI, wherein the BTPI is not included in the trigger message.

In another aspect there is provided a second method performed by a TRP. In one embodiment the second method includes triggering a UE to perform reference signal (RS) measurements with respect to a set of one or more RS resources. Triggering the UE to perform the RS measurements comprises transmitting to the UE information comprising a measurement indicator, MI, (which is another name for the BTPI and which is also known as a Transmission Configuration Indicator (TCI)) indicating that the set of RS resources are spatially quasi co-located, QCL, with an RS resource from a prior measurement.

In another aspect there is provided a third method performed by a TRP. In one embodiment the third method includes triggering the UE to perform RS measurements with respect to a set of one or more RS resources, wherein triggering the UE to perform the RS measurements comprises transmitting to the UE information comprising an indicator (e.g., a Measurement Indicator (MI)), wherein i) the indicator is associated with a transmit spatial filtering configuration (which may include one or more of beamforming weights, antenna weights, precoding weights, precoding vector(s), etc.) that the TRP will use to transmit the set of RS resources or ii) the TRP will associate the indicator with a transmit spatial filtering configuration (which may include one or more of beamforming weights, antenna weights, precoding weights, precoding vector(s), etc.) based on a report sent by the UE indicating one or more preferred RS resources.

In another aspect there is provided a fourth method performed by a TRP. In one embodiment the fourth method includes transmitting to a UE a first message comprising a certain indicator associated with a transmit spatial filtering configuration (which may include one or more of beamforming weights, antenna weights, precoding weights, precoding vector(s), etc.). After transmitting the first message to the UE, transmitting to the UE a control message for scheduling a PDSCH transmission for the UE, wherein the certain indicator associated with the transmit spatial filtering configuration is included in the control message. And, after transmitting the control message, performing the PDSCH transmission using the transmit spatial filtering configuration associated with the certain indicator.

In some embodiments, transmitting the control message comprises transmitting Downlink Control Information, DCI, on a physical downlink control channel PDCCH, wherein the DCI includes the certain indicator.

In another aspect there is provided a TRP that is configured to perform any one or more of the steps described herein.

In another aspect there is provided a TRP that includes at least one processor and a memory comprising instructions executable by the at least one processor, whereby the TRP is configured to perform any one or more of the steps described herein.

In another aspect there is provided a TRP that includes a transmitting unit, configured to transmit, from the TRP to the UE, a first beam tracking process index, BTPI, associated with a first link between the TRP and the UE.

In another aspect there is provided a first method performed by a UE communicating with a TRP. The first method includes receiving, at the UE from the TRP, a first beam tracking process index, BTPI, associated with a first link between the TRP and the UE.

In some embodiments, the first link between the TRP and the UE is an active link.

In some embodiments the method further includes receiving, at the UE from the TRP, a second BTPI associated with a second link between the TRP and the UE.

In some embodiments, the second link between the TRP and the UE is a monitored link.

In some embodiments, the first BTPI is received in a message with one or more channel state reference signal, CSI-RS, configurations for the first link and the second BTPI is received in a message with one or more CSI-RS configurations for the second link.

In some embodiments the method further includes receiving, at the UE from the TRP, a message comprising a CSI-RS configuration and the first BTPI associated with the first link.

In some embodiments the method further includes determining a preferred CSI-RS configuration for the first link; and transmitting, from the UE to the TRP, an identification of the preferred CSI-RS configuration for the first link.

In some embodiments the method further includes determining, based at least in part on the one or more CSI-RS configurations for the first link, a set of one or more UE receive beam parameters for the first link and storing, in a memory of the UE and together with the first BTPI, the one or more UE receive beam parameters for the first link.

In some embodiments receiving the first BTPI comprises receiving a control message for scheduling a PDSCH transmission, wherein the first BTPI is included in the control message. In some embodiments the method further includes, prior to receiving the control message, receiving a trigger message for triggering the UE to perform reference signal, RS, measurements with respect to a set of one or more RS resources. In some embodiments, the trigger message is a report trigger message for triggering the UE to transmit at least one measurement report after performing the RS measurements.

In some embodiments the trigger message comprises the first BTPI.

In some embodiments the method further includes, after receiving the trigger message and before receiving the control message, receiving a message comprising the BTPI, wherein the BTPI is not included in the trigger message.

In another aspect there is provided a second method performed by a UE communicating with a TRP. The second method includes receiving a first message transmitted by the TRP, the first message comprising a certain indicator. After receiving the first message, receiving from the TRP a control message for scheduling a PDSCH transmission for the UE, wherein the certain indicator is included in the control message. After receiving the control message, using the certain indicator determining a spatial filtering configuration associated with the certain indicator. And after determining the spatial filtering configuration, using the spatial filtering configuration to receive the PDSCH transmission.

In another aspect there is provided a UE that is configured to perform any one or more of the steps described herein.

In another aspect there is provided a IE that includes at least one processor and a memory comprising instructions executable by the at least one processor, whereby the UE is configured to perform any one or more of the steps described herein.

In another aspect there is provided a UE that includes a receiving unit, configured to receive, at the UE from the TRP, a first beam tracking process index, BTPI, associated with an first link between the TRP and the UE.

In another aspect there is provided a method performed by a TRP. In one embodiment the method includes transmitting, from the TRP to the UE, a first beam tracking process index (BTPI) associated with an active link between the TRP and the UE. The method further includes transmitting, from the TRP to the UE, a second BTPI associated with a monitored link between the TRP and the UE. In certain aspects, the method further includes transmitting, from the TRP to the UE, a message comprising a CSI-RS configuration and the first BTPI associated with the active link, as well as transmitting a second message comprising a CSI-RS configuration and the second BTPI associated with the monitored link. The method may also include receiving, from the UE, a first identification of a transmit beam for the active link, wherein the first identification is associated with the first BTPI. The method may also include receiving, from the UE, a second identification of a transmit beam for the monitored link, wherein the second identification is associated with the second BTPI. In some embodiments, the identification may be of the preferred beams for the particular links. The identified transmit beams may be used to transmit one or more of control information and data to the UE.

According to some embodiments, a reporting request may also be sent to the UE, where the reporting request comprises a third beam index. In certain aspects, this index may comprise an indicator (e.g., a flag) indicating that the UE should not change a beam associated with a link between the TRP and the UE.

In another aspect, there is provided a method performed by a UE. In one embodiment the method includes receiving, at the UE from the TRP, a first beam tracking process index associated with an active link between the TRP and the UE, and a second BTPI associated with a monitored link between the TRP and the UE. In some embodiments, the first BTPI is received in a message with one or more CSI-RS configurations for the active link and the second BTPI is received in a message with one or more CSI-RS configurations for the monitored link. The UE may then determine, based at least in part on the one or more CSI-RS configurations for the active link, a preferred transmit beam for the active link. Similarly, based at least in part on the one or more CSI-RS configurations for the monitored link, a preferred transmit beam for the monitored link may be determined. The method further includes transmitting to the TRP an identification of the preferred transmit beams for the active and monitored links. According to certain aspects, the UE will also determine, based at least in part on the one or more CSI-RS configurations for the active link, a set of one or more UE receive beam parameters for the active link, as well as determining, based at least in part on the one or more CSI-RS configurations for the monitored link, a set of one or more UE receive beam parameters for the monitored link. The receive beam parameters may be stored in a memory of the UE together with the respective BTPIs. The method may also include accessing the stored receive beam parameters to received, from the TRP, one or more of control information and data on the preferred transmit beam(s) of the active and/or monitored link(s).

According to some embodiments, the UE receives from the TRP first and second transmit beams associated with the beam tracking processes for the active link and the first BTPI, where the first transmit beam is a best known transmit beam. The UE may then obtain from memory (e.g., using the first BTPI), a first beam quality value associated with the first transmit beam. The UE may then determine a second beam quality value for the second transmit beam and compare the first and second beam quality values. Based on the result, the UE may then update one or more stored UE receive beam parameters.

In some embodiments, the UE receives a third beam index, wherein the third beam index comprises an indicator (e.g., flag) indicating that the UE should not change a beam associated with either the active or monitored link between the TRP and UE. The UE, according to some aspects, will then perform a channel test based at least in part on the received message, report the result of the channel test to the TRP, and do so without updating UE receive beam parameters for either of the active or monitored links.

According to some embodiments, TRPs and UEs performing the foregoing methods are also provided.

BRIEF DESCRIPTION OF THE DRAWINGS

The accompanying drawings, which are incorporated herein and form part of the specification, illustrate various embodiments.

DETAILED DESCRIPTION

Figure 1A:
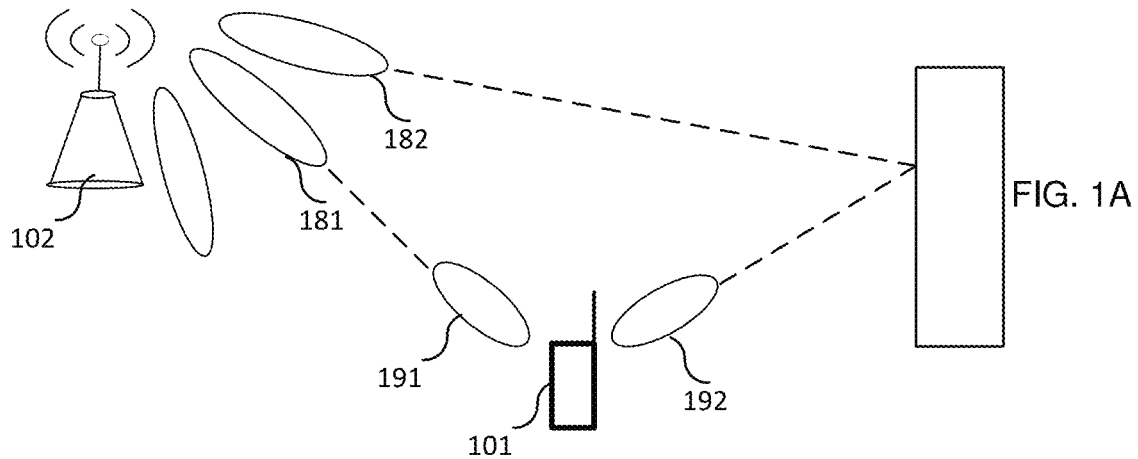
FIGS. 1A, 1B and 1C illustrate the use of active and monitored TX beams for communications between a TRP and a UE.

To perform measurements of channel quality of a certain beam, a beamformed reference signal may be used. Beamforming may include, for instance, transmitting the same signal from multiple antenna elements of an antenna array with an amplitude and/or phase shift applied to the signal for each of the antenna elements. These amplitude/phase shifts are commonly denoted as the antenna weights and the collection of the antenna weights for each of the antennas is a precoding vector. Different precoding vectors give rise to a beamforming of the transmitted signal and the weights can be controlled so that the signals are coherently combining in a certain angle direction as seen from the antenna array, in which case it may be the that a beam is formed in that "direction." If the antennas of the array are placed in two dimensions (i.e., in a plane), then the beam can be steered in both azimuth and elevation directions with respect to the plane perpendicular to the antenna array.

Although the term beam is used herein, there are other precoding vectors that give a transmission that is matched to the channel and which does not give a beam in a strict sense. For instance, if the channel is known at the TRP, the precoding weight can be controlled so that the signal strength is maximized the UE, instead of forming a beam to give the maximal array gain in a certain direction. Matched channel precoding may be optimal for maximizing the signal power at the receiver, but may require accurate channel information. In line of sight channels however, the use of a beam is often near optimal. Though discussed with respect to beams, the disclosures herein are presented without loss of generality.

In NR it is proposed that beam reference signals (BRS) or channel state information reference signals (CSI-RS) are used as reference signals for beam management. As used herein, CSI-RS may refer to the RS used for beam management without loss of generality. The network (NW), NR base station (gNB) or another node may configure the UE with a CSI-RS configuration by a control message, for instance, such as a radio resource control (RRC) message. Each configuration can contain one or multiple CSI-RS resources. One or multiple UEs may then perform measurements on these CSI-RS resources and report the result back to the network.

By way of example, each CSI-RS resource may be transmitted in a different TRP transmit (TX) beam. Each different TRP TX beam may have a different multi-antenna precoding weight to form beams in different directions as seen from the TRP antenna array. In this example, the UE can be configured to perform channel quality measurements (such as reference signal received power (RSRP)) using the configured CSI-RS resources corresponding to the different TRP TX beams, and it may further be configured to report back these measurements to the NW. In this way it is possible, by using the measurement report(s), for the NW to find a preferred TRP TX beam(s) for a given UE.

In a second example, each CSI-RS resource may be transmitted in the same TRP TX beam. In this way, the UE can evaluate different UE RX beams for the used TRP TX beam, and find a preferred UE receive (RX) beam for the particular TRP TX beam. A UE RX beam may be understood, for instance, as a set of UE receiver antenna/array parameters. The repeated transmission of the CSI-RS resource in the same beam, for instance, in different OFDM symbols, is useful for example when analog receive beamforming is applied at the UE since the UE can then switch RX beam between the OFDM symbols and evaluate the link quality. According to some embodiments, the CSI-RS transmission can be either aperiodic (for example event triggered) or transmitted in a semi-persistent/periodic manner. In cases where the CSI-RS transmissions are transmitted in a semi-persistent/periodic manner also, the measurement reports can be configured in a semi-persistent/periodic manner.

Using the procedures described above, a UE can find a preferred TRP TX beam and for that beam a preferred UE RX beam. This TX/RX beam pair is sometimes referred to as a beam pair link (BPL). However, one problem with connecting UEs to narrow beams is that the BPL could easily be deteriorated, for example, if an object gets in the way of the link and blocks it. Due to what is often high penetration loss and poor diffraction properties at high frequencies, a blocking object can lead to lost connection between the TRP and UE (so called a beam link failure (BLF) or BPL failure (BPLF)), which might lead to dropped calls and bad user experience.

Figure 1B:
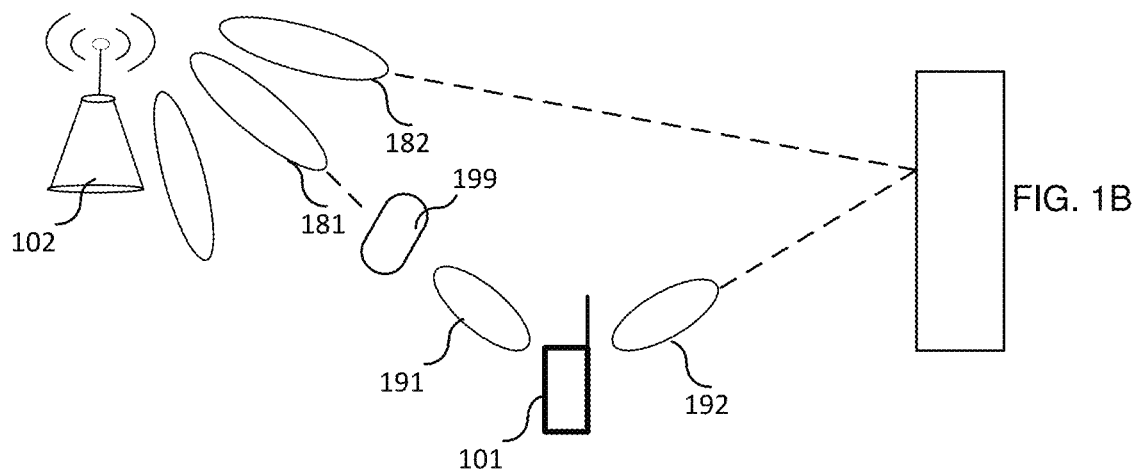
Figure 1C:
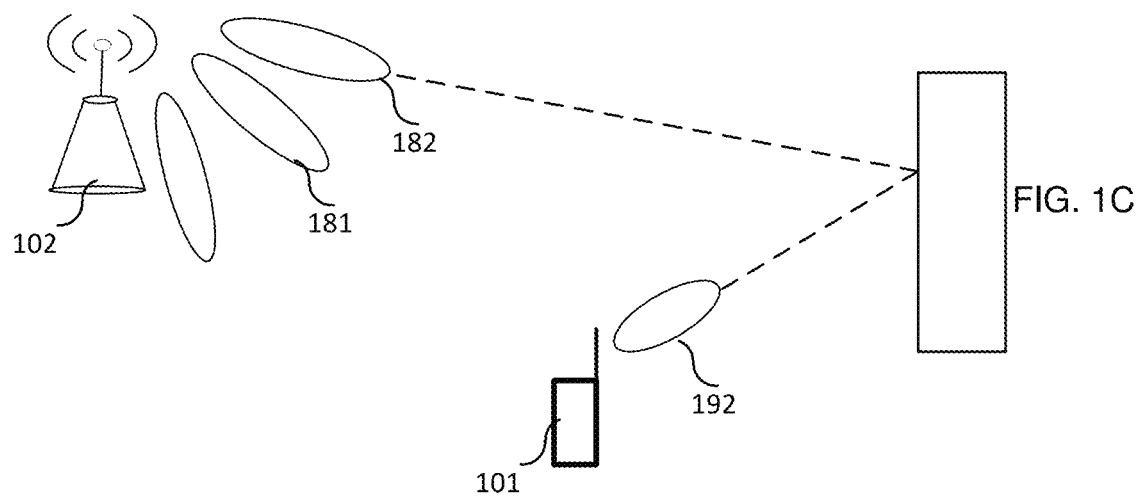

One way to mitigate the problem of beam link failure is to use a second, monitored (a.k.a., backup) transmit beam that can be used in case the first, active TX beam experiences a BLF (e.g., is blocked). Hence, at least two TX beams may be used to connect with a UE. An example of this is illustrated in FIGS. 1A, 1B and 1C. In FIG. 1A, there is shown a TRP 102 (e.g., a base station) using one active TX beam 181 for a UE 101 to transmit to the UE 101 control information and user data and further using one monitored (backup) TX beam 182 for the UE 101. In FIG. 1B there is shown an object 199 that is blocking the active TX beam, thereby causing the UE 101 to detect a BLF with respect to the active TX beam. To restore the connection between the TRP 102 and the UE 101, the TRP 102 can use the monitored TX beam as the active TX beam for the UE 101, as illustrated in FIG. 1C. According to certain aspects, the purpose of the monitored link is thus to (1) discover new links that may better than the active link; and (2) provide a backup link in case the active link is broken.

In the example of FIG. 1A, there is one UE RX beam associated with each TRP TX beam (i.e., UE RX beam 191 is associated with TX beam 181 and UE RX beam 192 is associated with TX beam 182), which is often the case if analog or hybrid receive beamforming is used at the UE 101. In the case the UE 101 uses pure analog receive beamforming, the UE 101 can only tune its receive beam to one TRP transmit beam at a time, e.g. per OFDM symbol. Likewise, if the TRP 102 uses analog transmit beamforming, only one beam can be transmitted at a time, e.g. per OFDM symbol. Hence, there is a need to align the transmit beam with the correct receive beam at a given time. For each of the TRP 102 TX beams, at a given point in time, there is an "optimal" UE RX beam (i.e., parameters) associated with it, among the set of possible UE RX beams.

If a network sets up a beam sweeping procedure for a beam tracking process using a CSI-RS configuration, the UE 101 may not know which beam tracking process the CSI-RS configuration belongs to. Therefore, it will not be possible for the UE 101 to associate the preferred UE-RX beams with a beam tracking processes (or link). Accordingly, when the TRP 102 transmits data using a certain link, the UE 101 will not know which UE RX beam to use. As such, embodiments include a beam tracking process index, which can be included in the CSI-RS configuration, that allows the UE 101 to know which CSI-RS configuration corresponds to which beam tracking process (and link). Also, an additional flag can be included, for instance in the CSI-RS configuration or reporting request message, that indicates that the CSI-RS configuration and/or reporting request message is not related to any beam tracking processes. This has the advantage, for example, that the UE 101 can automatically remember which UE RX beam to use for each respective link (active or monitored). This will reduce the amount of required overhead signaling, and thus, improve performance between the TRP 102 and UE. In some aspects, the flag is a particular value of the BTPI.

One way to find and maintain the suitable TRP and UE beam for each link (active or monitored) is to configure a separate beam tracking processes per link. A beam tracking process can be defined at the NW and associated with a transmission of reference signals (e.g. CSI-RS, BRS or similar) in different beams, which will be measured and reported back from the UE 101. Hence, each beam tracking process can be updated using measurements associated with the process. The aim of the measurements is to update and refine the TRP 102 TX beam and UE RX beam, often referred to as the beam pair link (BPL). Although the disclosures herein are provided with respect to the downlink, the BPL can be used for the uplink transmission as well, particularly where the UE 101 RX beam and UE TX beams are well calibrated (same beam direction) and the same for TRP TX beam and TRP RX beams. That is, the processes disclosed herein can be used to identify and manage the beams used for uplink communications.

To minimize the beam management related control signaling between the TRP 102 and the UE 101, certain aspects provide that the choice of TRP TX beam can be transparent to the UE 101 and that the choice of UE RX beam can be transparent to the NW. That is, that the exact details of the precoder weights is not known, or the angle of direction of beam transmission, etc., used on transmitter side of the link is not known at the receiving side of the link. Instead, an implicit or explicit identity of a certain CSI-RS transmission can be used (which identity then is equivalent to a TX beam) and the NW and UE side can then refer to this identity in beam tracking process.

Figure 2:
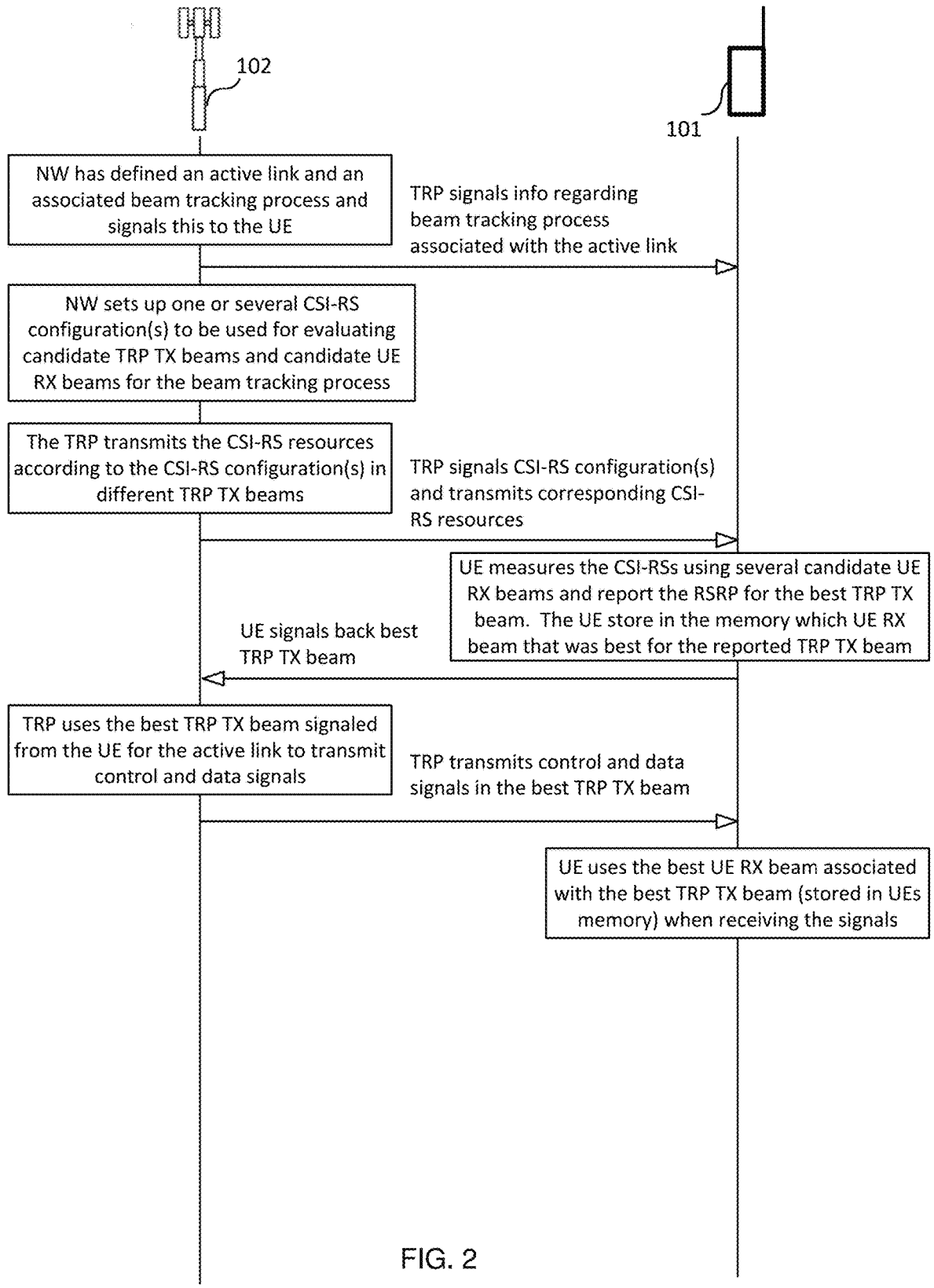
FIG. 2 is a signal diagram illustrating a processing according to some embodiments.

In one solution for data transmission for a given beam tracking process, the UE 101 assumes that the used TRP TX beam is the TRP 102 TX beam corresponding to the beam tracking process, unless the TRP 102 explicitly signals otherwise in a control message. To enable this, the UE 101 associates and stores the preferred UE RX beam associated with the best TRP TX beam for the active link as was reported from a previous CSI-RS configuration measurement. A signaling diagram illustrating this process is shown in FIG. 2. This procedure can be applied to a first beam process, for instance, the active BPL. If a second process, or BPL, such as the monitored link is introduced, then the UE 101 must find a suitable UE RX beam for the second link as well. This may introduce a problem with respect to how to distinguish multiple links from the NW and the UE 101 side with efficient management and without introducing additional signaling overhead. For a monitoring link, the UE 101 must remember the best UE RX beam corresponding to the best TRP TX beam associated to the beam tracking process for that monitoring link, which may be different from the UE 101 RX of the active link. This may be important in the case that the TRP 102 decides to switch from the current active link to the monitoring link—the UE 101 must know which UE RX beam to use after the link switch otherwise the reception performance will be poor.

Thus, according to some embodiments, an identifier associated with a beam tracking process and/or CSI-RS measurement is introduced. Additionally, the UE 101 can store, for each identifier, a preferred UE RX beam. According to some embodiments, the UE 101 may further store the related link quality (such as RSRP or CQI), that is, when the preferred CSI-RS resource (i.e. TRP TX beam) and UE RX beam is used. The measurement that has an associated identifier may be an aperiodic triggered CSI-RS resource transmission of one or multiple beams, for example. Alternatively, the CSI-RS resource transmissions for the one or multiple beams may be pre-configured and periodically transmitted and the measurement and trigger, which contains the identifier, is aperiodically triggered.

According to certain aspects, a measurement is tagged with an identifier that identifies the beam tracking process (or beam pair link or TRP TX beam) it belongs to. This enables the UE 101 to have information regarding which of the multiple beam pair links (such as active or monitored) the currently performed configuration and/or measurement report is related to, and which among the stored UE RX beams should be changed or updated based on the current measurements. In one embodiment, the network/TRP and UE associates a beam tracking process to each beam pair link and gives each beam tracking process a beam tracking process index (BTPI). This BTPI is, for example, the tag/identifier. Whenever the network/TRP sets up a CSI-RS configuration, or triggers a report for an already configured CSI-RS configuration, the BTPI can be included in the message from the network/TRP to the UE 101. According to some embodiments, the BTPI may be included as a value in one or more messages, such as a CSI-RS, or separately signaled to the UE 101 via a new message. In this way, the UE 101 will know which beam tracking process (or, equivalently, the beam pair link) the CSI-RS measurement configuration belongs to. According to certain aspects, the number of links may be of a size such that only a few bits will be needed to signal the BTPI to the UE 101.

These procedures enable the UE 101 to store the information of the preferred UE RX beam for a respective TRP TX beam/beam pair link/beam tracking process, which will reduce the amount of required overhead signaling. The receive parameters for the preferred UE RX beam may be stored with BTPI for subsequent access and receipt of control and data information from the network/TRP. Additionally, because the UE 101 may also store the link quality, the UE 101 can perform comparisons to find a better RX beam when measuring CSI-RS resources tagged with a certain BTPI. The preferred beam may be updated such that it is used in the future when the BTPI is signaled in a control message, e.g. when scheduling a PDSCH message.

Figure 3:
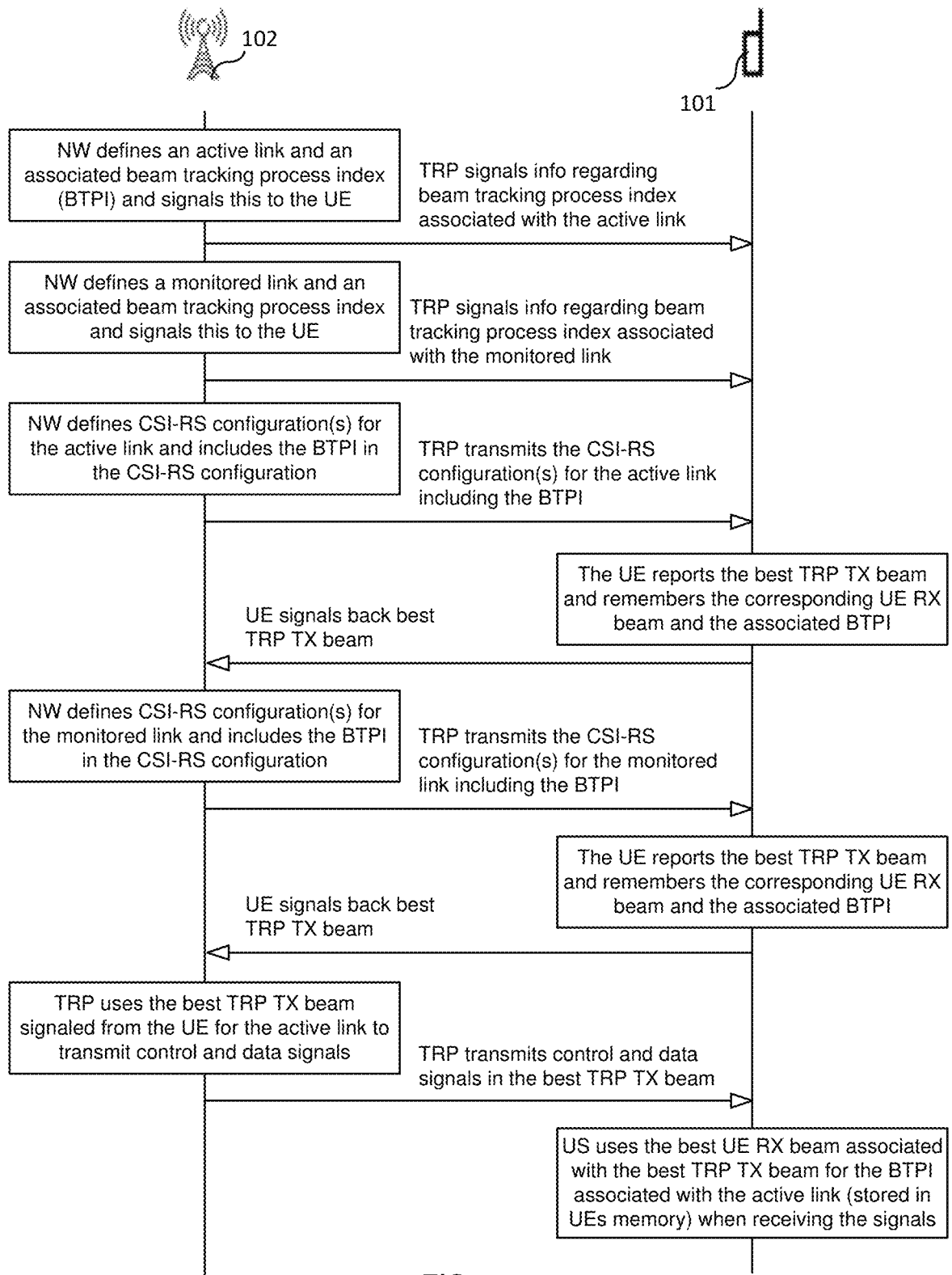
FIG. 3 is a signal diagram illustrating a processing according to some embodiments.

FIG. 3 is a signaling diagram that illustrates some embodiments. In this example, the network/TRP sets up two different links, one active and one monitored, and associates each link with a beam tracking process index.

As shown in the example of FIG. 3, the network and/or TRP may define an active link and an associated BTPI, that is signaled to UE. Similarly, a monitored link and associated BTPI is defined and signaled to the UE 101. The network and/or TRP may then further define one or more CSI-RS configurations for the active link, which includes the BTPI for that link. This may then be transmitted to the UE 101. The UE 101 may then use the CSI-RS to evaluate the best (preferred) transmit beam for the link, report the preferred link to the network/TRP, and store the corresponding UE receive beam and the associated BTPI in its memory. Similarly, the network and/or TRP may then further define one or more CSI-RS configurations for the monitored link, which includes the BTPI for that link. This may then be transmitted to the UE 101. The UE 101 may then use the CSI-RS to evaluate the best (preferred) transmit beam for the monitored link, report the preferred link to the network/TRP, and store the corresponding UE receive beam and the associated BTPI in its memory. Based on this signaling: (1) the network/TRP is notified of the preferred active and monitored link beams; (2) the UE 101 has stored (and can subsequently access for receipt of data) optimal UE RX beams for each link; and (3) the BTPI can be used to manage and control the generated information. For instance, in the example of FIG. 3, the TRP 102 uses the best (preferred) TRP transmit beam signaled from the UE 101 to transmit control and data signals to the UE 101 on the preferred beam of the active link. The UE 101 can then use the appropriate UE RX beam (for instance, accessed using the BTPI) to receive the signals from the TRP 102. When the TRP 102 switches transmission to the monitored link, the UE 101 may access the appropriate UE RX beam (e.g., using the BTPI of the monitored link) for receipt of the signals. This may be done without the need for additional signaling.

According to certain aspects, the network/TRP may want to evaluate candidate TRP TX beams without changing the current beams associated with any of the active or monitored links. In one embodiment, an additional flag (or bit) or state in the BTPI is included and signaled together with the CSI-RS configuration, trigger of the report, or other message to the UE 101. For example, the flag can be a "1" in the case it is related to an active or monitored link, and a "0" if it is not related to any link. In this way, the meaning of the BTPI is expanded to further control the actions of the UE 101. That is, the BTPI can be use the network/TRP to obtain reports related to a given beam tracking process without disrupting the existing link.

According to certain aspects, the network/TRP transmits a set of at least two different beams to be measured for a given beam tracking process (i.e. for a given BTPI). In some embodiments, the transmission includes in the set the best known TRP TX beam for the given tracking process. In this way, together with the procedures described above, it can be ensured that the quality of any new beam is compared with the previously known best beam. If this procedure is not used, then there is a risk that the UE 101 will change the preferred beam for another that is worse than the previously known best TRP TX beam, or change the UE 101 RX beam to a non-optimal set of parameters. In certain aspects, the UE 101 may store information relating to the best beams, and access this information for comparison purposes. The network/TRP does not necessarily need to include the best known TRP TX beam for the UE 101 where the UE 101 stores the quality measure (e.g. RSRP) of the previously reported best link (best link quality BLQ). In some embodiments, the UE 101 compares the quality of each measured link (CSI-RS resource and UE RX beam combination) for a given BPTI tag with BLQ and updates the UE 101 RX beam only if the current best link quality is better (e.g. higher RSRP) than the BLQ. Further, the BLQ may be associated with a timer, so that if the after some predefined or higher layer configured time, the BLQ is erased and a more recently measured BLQ value is used instead.

Figure 4:
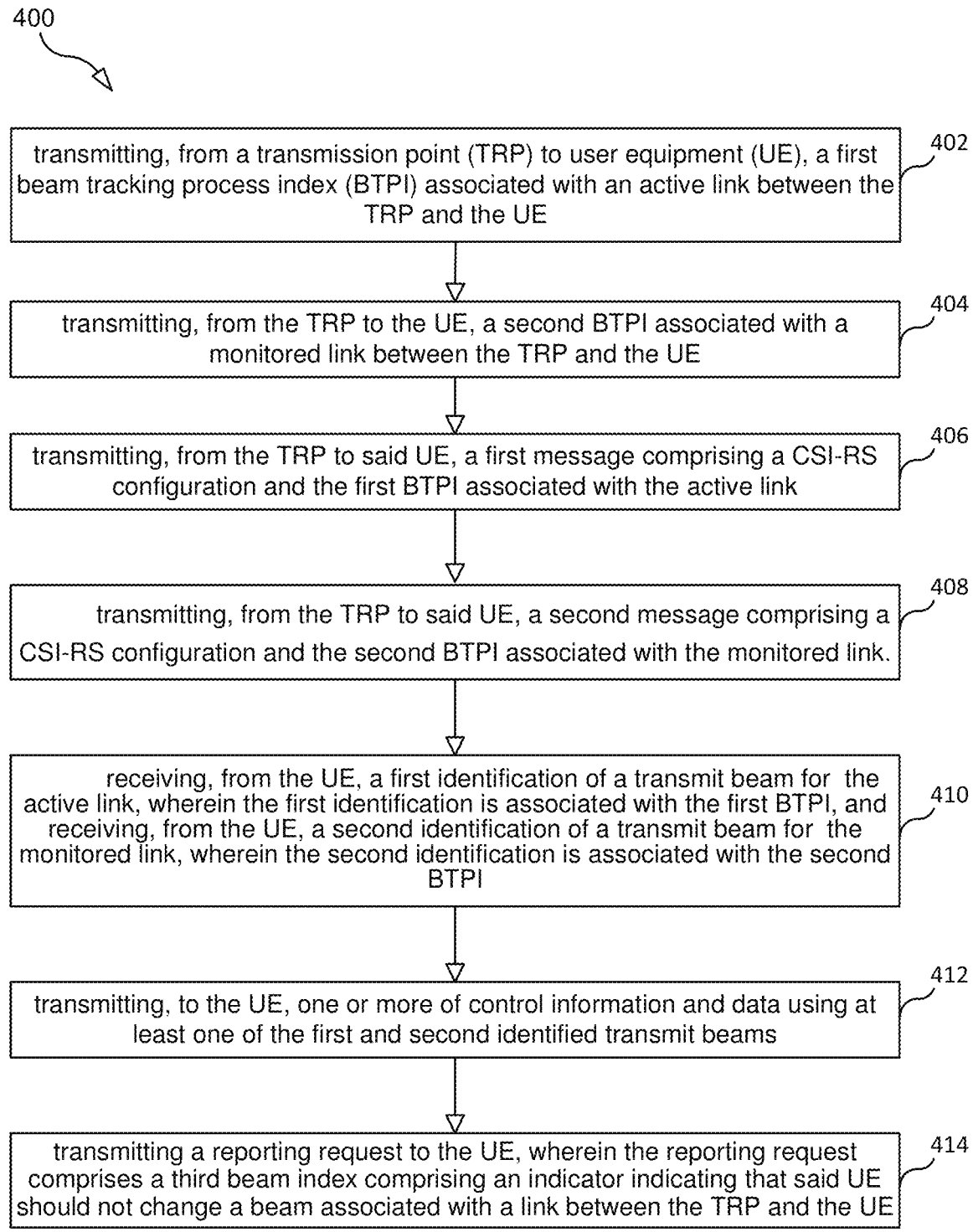
FIG. 4 is a flow chart illustrating a process according to some embodiments.

Referring now to FIG. 4, FIG. 4 is a flow chart illustrating a process 400, according to some embodiments, performed by a TRP in communication with a UE. According to certain aspects, communications between the TPR and UE are wireless over the air interface, for instance, according to NR radio access technology.

Process 400 may begin with step 402 in which the TRP 102 transmits to the UE 101 a first beam tracking process index (BTPI) associated with an active link between the TRP 102 and the UE 101. According to certain aspects, the BTPI is used to identify a particular beam tracking process, such as an active process or a monitored process. In some embodiments, the BTPI is a multi-bit identifier. The BTIP may, for example, have a value for a first beam tracking process, and a second value for a second beam tracking process. Further, the BTPI may include a third value indicating that a particular transmission or operation (e.g., measurement) is not associated with any particular beam tracking process. Accordingly, the BTPI may be understood as a "flag" and/or incorporate one or more bits acting as a flag. In step 404, the TRP 102 transmits to the UE 101 a second beam tracking process index associated with a monitored link between the TRP 102 and the UE 101. The active link may refer, for instance, to the transmit beam of the TRP 102 and the receive beam of the UE 101 used for transmitting data, including control data, signaling information, and or payload data. The monitored link may refer, for instance, to the transmit beam of the TRP 102 and the receive beam of the UE 101 used as a backup and/or optional link for communications, as needed.

In step 406, the TRP 102 transmits to the UE 101 a message comprising a CSI-RS configuration and a first BTPI, which is associated with a particular link, such as the active link. In step 408, the TRP 102 transmits to the UE 101 a message comprising a CSI-RS configuration and a second BTPI, which is associated with a different link, such as the monitored link. According to certain aspects, the reference signals used in steps 406 and 408 may be the same, or alternatively, may be adjusted according to the particular link. Further, according to certain alternative embodiments, the initial transmission of the BTPI (steps 402 and 404) may comprise the transmission of one or more CSI-RS configurations, and as such, steps 406 and 408 need not be repeated.

In step 410, the TRP 102 receives, from the UE 101, a first identification of a transmit beam for the active link. According to some embodiments, the first identification is associated with the first BTPI. The TRP 102 further receives from the UE 101 a second identification of a transmit beam for the monitored link. According to some embodiments, the second identification is associated with the second BTPI. The first and second beams are, for example, preferred beams identified by the UE 101. The UE 101 may identify the preferred beams, for instance, based on received signal quality measurements. In this manner, the BTPI can be used to keep track of and identify the preferred beams associated with a particular beam tracking process, and utilize the best links without the need for additional signaling.

In step 412, the TRP 102 transmits to the UE 101, one or more one of control information and data using at least one of the first and second identified transmit beams. According to some embodiments, the TRP 102 may first transmit to the UE 101 on the active link using the first identified transmit beam, and, for instance if there is a break in the link, subsequently transmit on the monitored link using the second identified transmit beam.

In step 414, the TRP 102 transmits a reporting request to the UE 101, wherein the reporting request comprises a third beam index. According to some embodiments, the third beam index comprises an indicator indicating that the UE 101 should not change a beam associated with a link between the TRP 102 and the UE 101. The indicator may be, for example, a single bit or "flag" according to certain embodiments. According to some embodiments, the indicator may be transmitted with one or more of the first or second BTPIs.

According to some embodiments, the first BTPI is associated with a beam tracking process that comprises the use of at least two different transmit beams. Accordingly, the TRP 102 may transmit the beams, and according to certain aspects, at least one of the two different transmit beams is a best known transmit beam for the particular tracking process. In some aspects, the at least two different transmit beams are associated with a same BTPI value. The TRP 102 may transmit the best known transmit beam with other beams to be evaluated by the UE 101, such that the UE 101 may fully compare any new beams to the previously best known beam.

Figure 5A:
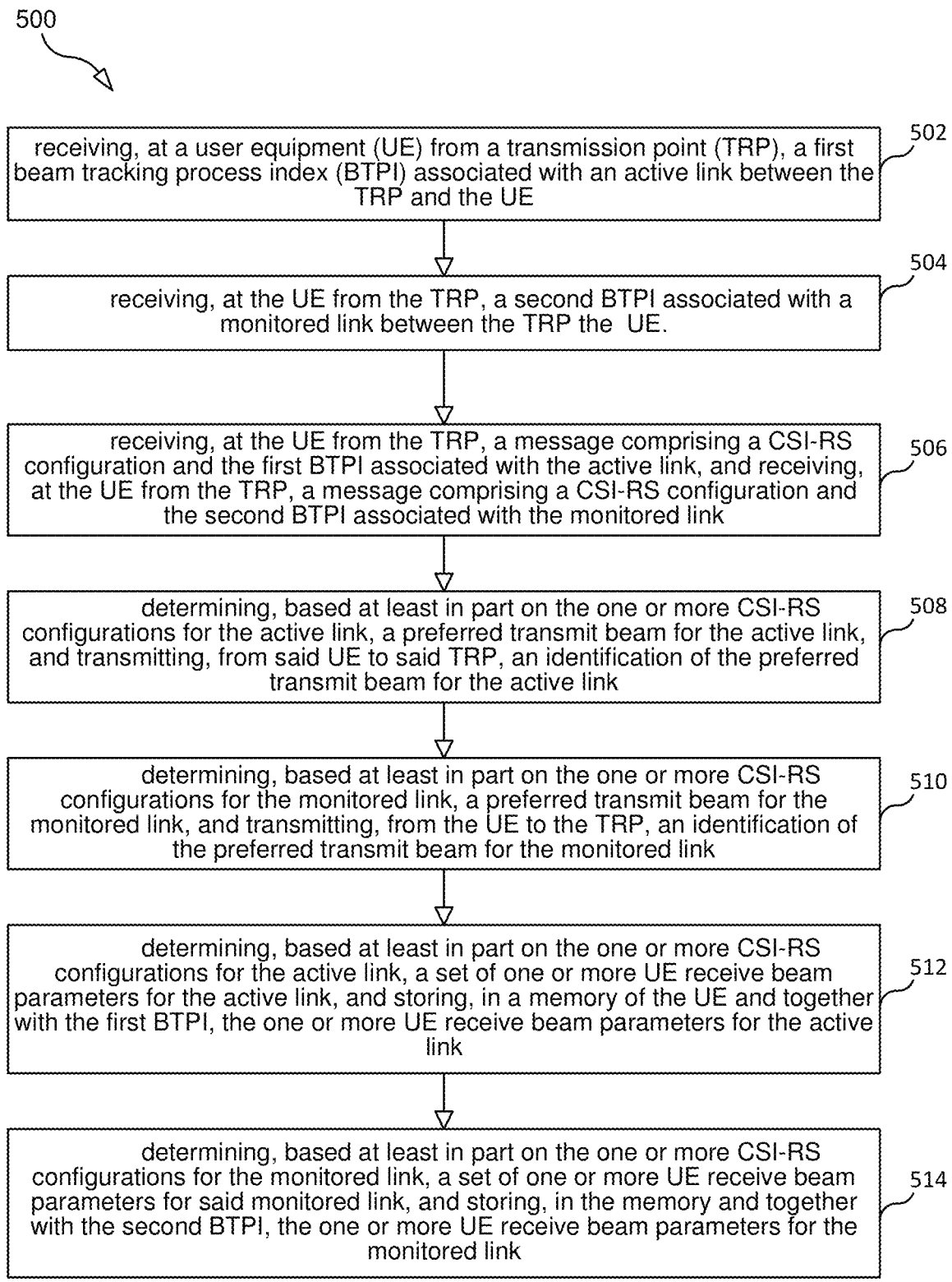
FIGS. 5A and 5B are flow charts illustrating processes according to some embodiments.
Figure 5B:
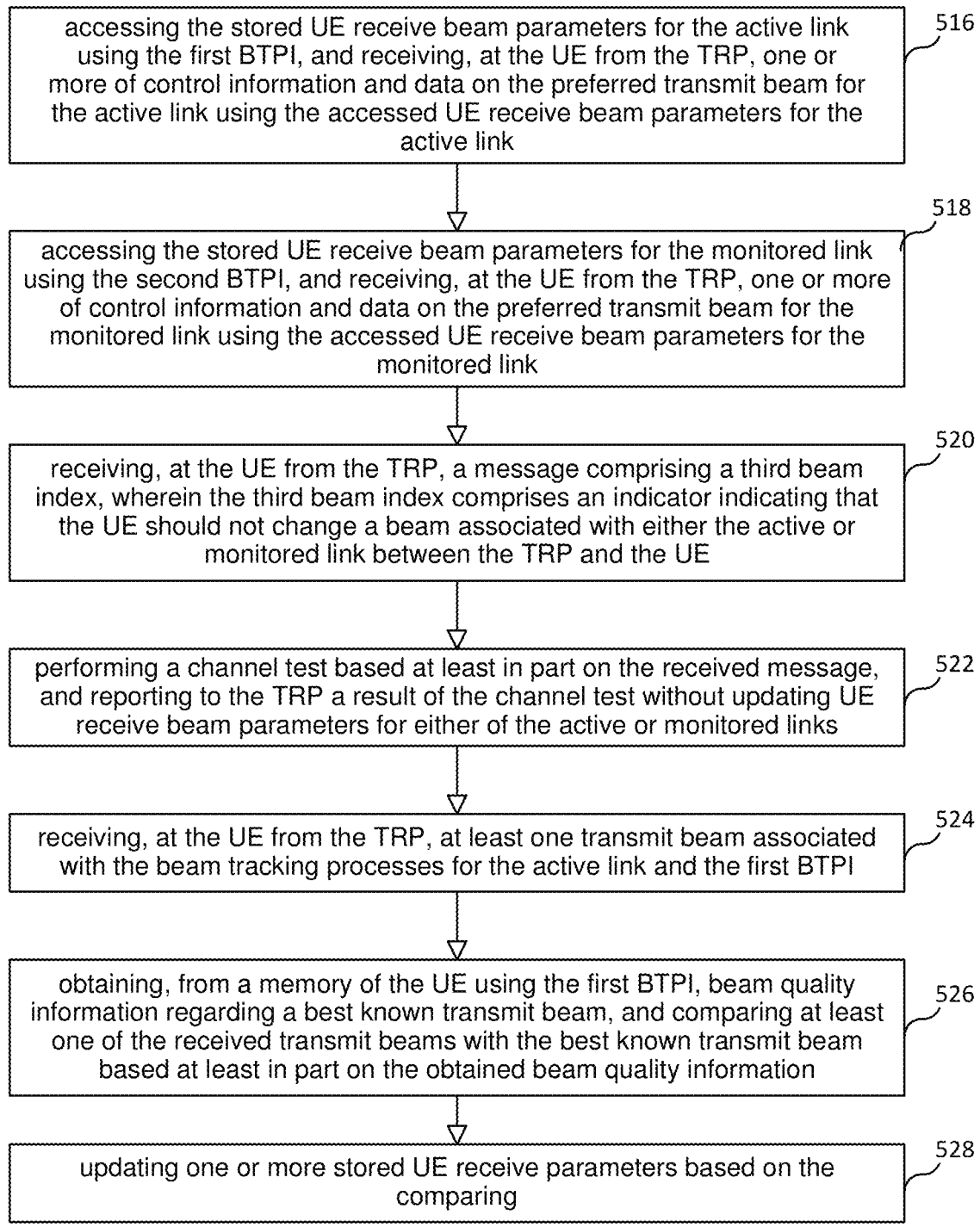

Referring now to FIGS. 5A and 5B, these figures are flow charts illustrating one or more processes 500, according to some embodiments, that are performed by the UE 101.

Process 500 may begin with step 502 in which a user equipment (UE) receives from a transmission point (TRP), a first beam tracking process index (BTPI) associated with an active link between the TRP 102 and the UE 101. In step 504, the UE 101 receives from the TRP 102 a second BTPI associated with a monitored link between the TRP 102 the UE 101. As set forth with respect to FIG. 4, the active link may refer, for instance, to the transmit beam of the TRP 102 and the receive beam of the UE 101 used for transmitting data, including control data, signaling information, and or payload data. The monitored link may refer, for instance, to the transmit beam of the TRP 102 and the receive beam of the UE 101 used as a backup and/or optional link for communications, as needed.

In step 506, the UE 101 receives from the TRP 102 a message comprising a CSI-RS configuration and the first BTPI associated with the active link, and receiving, at the UE 101 from the TRP 102, a message comprising a CSI-RS configuration and the second BTPI associated with the monitored link. According to certain alternative embodiments, the initial transmission of the BTPI (steps 502 and 504) from the TRP 102 may comprise the transmission of one or more CSI-RS configurations, and as such, step 506 may not need to be repeated.

In step 508, the UE 101 determines, based at least in part on one or more of the CSI-RS configurations for the active link, a preferred transmit beam for the active link. The UE 101 may then transmit an identification of the preferred transmit beam for the active link. In step 510, the UE 101 determines, based at least in part on one or more CSI-RS configurations for the monitored link, a preferred transmit beam for the monitored link. The UE 101 may then transmit an identification of the preferred transmit beam for the monitored link. According to certain embodiments, the preferred transmit beam(s) for the active and/or monitored links may be identified using the BTPI.

In step 512, the UE 101 determines, based at least in part on the one or more CSI-RS configurations for the active link, a set of one or more UE receive beam parameters (a.k.a., spatial filtering configuration) for the active link. The UE 101 receive beam parameters for the active link are stored in a memory of the UE 101 together with the first BTPI. Similarly, in step 514, the UE 101 determines, based at least in part on the one or more CSI-RS configurations for the monitored link, a set of one or more UE receive beam parameters for the monitored link. The UE 101 receive beam parameters for the monitored link are stored in a memory of the UE 101 together with the second BTPI. According to certain embodiments, the UE 101 receive beam parameters are the parameters used to properly receive the transmitted beam of the link. The UE 101 receive beam parameters (i.e., spatial filtering configuration) may include, for example, one or more antenna weights (e.g., amplitude and phase shift values) and/or processing vectors. In certain aspects, the processing vectors may be used for combining received signals from multiple receive antennas, including individual phase and/or amplitude adjustment of each signal before combining or summation of the signals. The stored UE receive beam parameters may be used for the receipt of information from the TRP 102 on the particular links. For example, if data transmission switches from the active to the monitored link, the UE 101 can access the UE 101 receive beam parameters for the monitored link without the need for additional signaling with the TRP 102 to establish optimal parameters.

In step 516, the UE 101 accesses the stored UE receive beam parameters for the active link. The parameters may be accessed, for instance, using the first BTPI. The UE 101 then receives from the TRP 102 one or more of control information and data on the preferred transmit beam for the active link using the accessed UE receive beam parameters for the active link. In step 518, for example, if there is a break in the active link, the UE 101 accesses the stored UE receive beam parameters for the monitored link, for example, using the second BTPI. The UE 101 may then receive from the TRP 102 one or more of control information and data on the preferred transmit beam for the monitored link using the accessed UE receive beam parameters for the monitored link.

According to some embodiments, and with respect to step 520, the UE 101 may receive from the TRP 102 a message comprising a third beam index. As described with respect to the operation of the TRP 102, the third beam index may comprise an indicator, or "flag," indicating that the UE 101 should not change a beam associated with either the active or monitored link between the TRP 102 and the UE 101. In step 522, the UE 101 performs a channel test based at least in part on the received message, and reports to the TRP 102 a result of the channel test without updating UE receive beam parameters for either of the active or monitored links. The channel test may be, for example, a measurement of one or more beams, such as a beam quality measurement. The measurement may be, for example, a measurement of reference signal received power (RSRP) for a given link or CQI. According to some embodiments, the UE 101 may store in memory values indicating the beam quality, and also, may store in memory values indicating the beam quality of a best known transmit beam. These values may be accessed and used in comparisons to determine whether to update the identification of the best known transmit beam.

In certain embodiments, the UE 101 may update one or more UE receive beam parameters, for instance, if the best known transmit beam changes. In step 524, the UE 101 receives from the TRP 102 at least one transmit beam associated with the beam tracking processes for the active link and the first BTPI. The UE 101 then obtains from memory, for instance using the first BTPI, beam quality information regarding a best known transmit beam. The UE 101 may then compare at least one of the received transmit beams with the best known transmit beam based at least in part on the obtained beam quality information. For instance, the UE 101 may determine a beam quality value for at least one of the received transmit beams and compare the value with a value for the best known transmit beam. In some aspects, the value may be the result of a RSRP measurement or CQI. Depending on the result of the comparison, the UE 101 may then update one or more stored UE receive parameters. This process may also be applied on the monitored link. In some embodiments, the TRP 102 may transmit the best known beam along with one or more other beams, and as such, the UE 101 may compare the other beams directly with the best known beam. In some embodiments, the TRP 102 may always transmit the best known beam.

Figure 6:
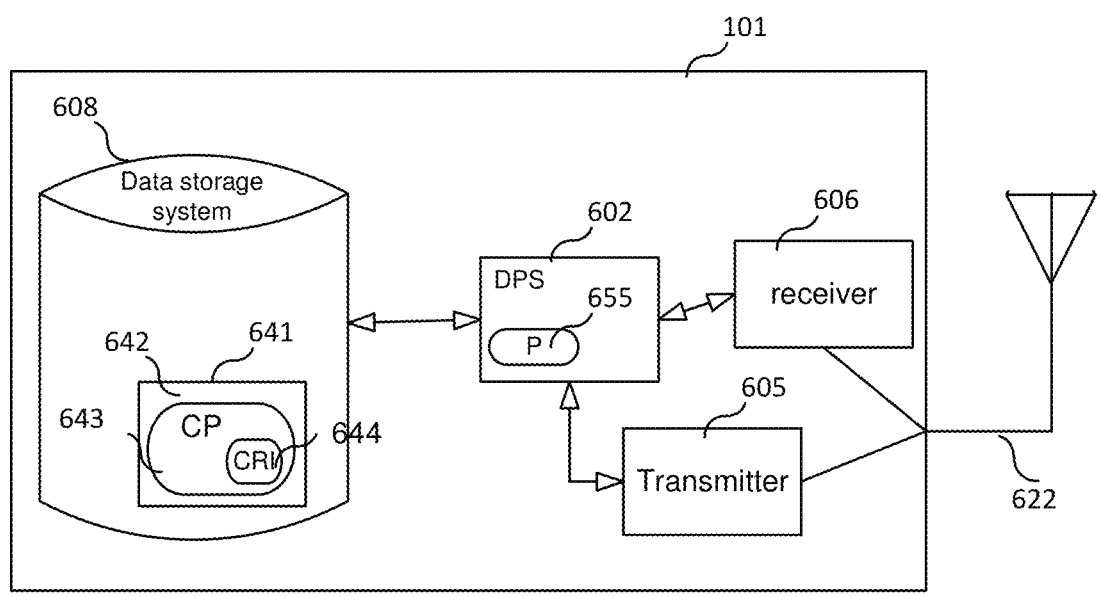
FIG. 6 is a block diagram of a UE according to some embodiments.

FIG. 6 is a block diagram of the UE 101 according to some embodiments. As shown in FIG. 6, the UE may comprise: a data processing system (DPS) 602, which may include one or more processors 655 (e.g., a general purpose microprocessor and/or one or more other processors, such as an application specific integrated circuit (ASIC), field-programmable gate arrays (FPGAs), and the like); a radio transmitter 605 and a radio receiver 606 coupled to an antenna 622 for use in wirelessly communicating with a radio access network (RAN) node (e.g., a TRP); and local storage unit (a.k.a., "data storage system") 608, which may include one or more non-volatile storage devices and/or one or more volatile storage devices (e.g., random access memory (RAM)). In embodiments where the UE includes a general purpose microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited, to magnetic media (e.g., a hard disk), optical media (e.g., a DVD), memory devices (e.g., random access memory), and the like. In some embodiments, the CRI 644 of computer program 643 is configured such that when executed by data processing system 602, the CRI causes the UE to perform steps described above (e.g., steps described above with reference to the flow charts). In other embodiments, the UE may be configured to perform steps described herein without the need for code. That is, for example, data processing system 602 may consist merely of one or more ASICs. Hence, the features of the embodiments described herein may be implemented in hardware and/or software.

Figure 7:
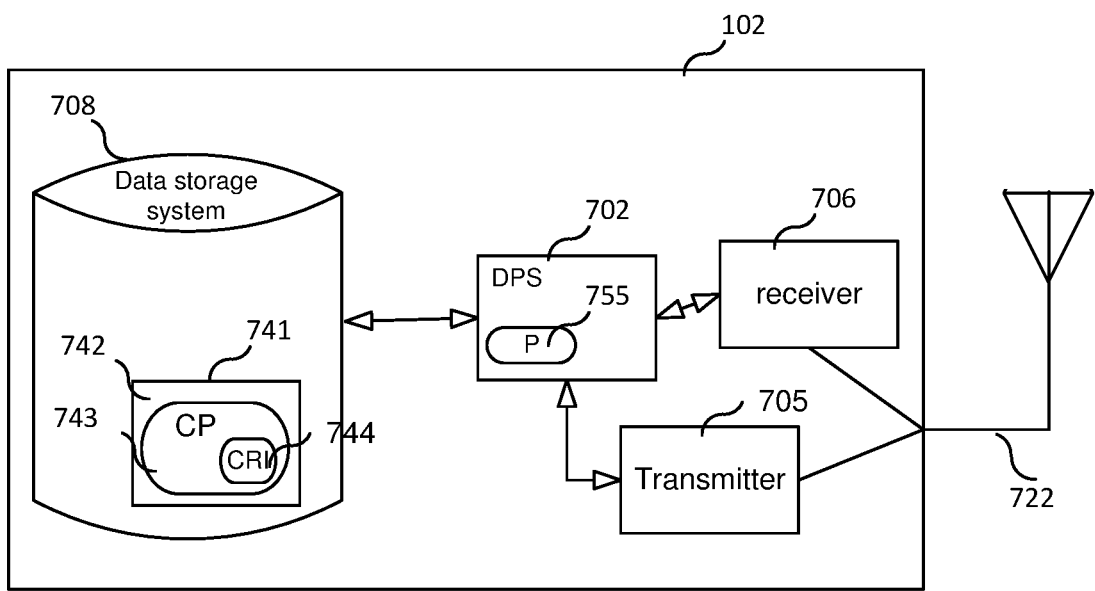
FIG. 7 is a block diagram of TRP according to some embodiments.

FIG. 7 is a block diagram of the TRP 102 according to some embodiments. As shown in FIG. 7, the TRP may comprise: a data processing system (DPS) 702, which may include one or more processors 755 (e.g., a general purpose microprocessor and/or one or more other processors, such as an application specific integrated circuit (ASIC), field-programmable gate arrays (FPGAs), and the like); a radio transmitter 705 and a radio receiver 706 coupled to an antenna 722 for use in wirelessly communicating with a UE; and local storage unit (a.k.a., "data storage system") 708, which may include one or more non-volatile storage devices and/or one or more volatile storage devices (e.g., random access memory (RAM)). In embodiments where the TRP includes a general purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media (e.g., a DVD), memory devices (e.g., random access memory), and the like. In some embodiments, the CRI 744 of computer program 743 is configured such that when executed by data processing system 702, the CRI causes the TRP to perform steps described above (e.g., steps described above with reference to the flow charts). In other embodiments, the TRP may be configured to perform steps described herein without the need for code. That is, for example, data processing system 702 may consist merely of one or more ASICs. Hence, the features of the embodiments described herein may be implemented in hardware and/or software.

In the following, further embodiments according to the present disclosure are described.

TRP Embodiments

1. A method performed by a transmission point (TRP) for communicating with a user equipment (UE), comprising: transmitting, from said TRP to said UE, a first beam tracking process index (BTPI) associated with an active link between said TRP and said UE.
2. The method of embodiment 1, further comprising: transmitting, from said TRP to said UE, a second BTPI associated with a monitored link between said TRP and said UE.
3. The method of embodiment 1 or 2, wherein transmitting said first BTPI comprises transmitting a message comprising said first BTPI and one or more channel state reference signal (CSI-RS) configurations for said active link.
4. The method of embodiment 2 or 3, wherein transmitting said second BTPI comprises transmitting a message comprising a second BTPI and one or more CSI-RS configurations for said monitored link.
5. The method of embodiment 1 or 2, further comprising: transmitting, from the TRP to said UE, a message comprising a CSI-RS configuration and the first BTPI associated with the active link.
6. The method of embodiment 5, further comprising: transmitting, from the TRP to said UE, a second message comprising a CSI-RS configuration and the second BTPI associated with the monitored link.
7. The method of any preceding embodiment, further comprising: transmitting a reporting request to said UE, wherein said reporting request comprises a third beam index comprising an indicator indicating that said UE should not change a beam associated with a link between said TRP and said UE.
8. The method of any previous embodiment, further comprising: transmitting a reporting request to said UE, wherein at least one of said first and second BTPIs comprises an indicator indicating that said UE should not change a beam associated with an active or monitored link between said TRP and said UE.
9. The method of any previous embodiment, wherein said first BTPI indicates a beam tracking process and wherein said beam tracking process comprises the use of at least two different transmit beams and wherein at least one of said two different transmit beams is a best known transmit beam for said tracking process and wherein said at least two different transmit beams are associated with a same BTPI value.
10. The method of any of embodiments 2-9, further comprising: receiving, from said UE, a first identification of a transmit beam for the active link, wherein said first identification is associated with said first BTPI; and receiving, from said UE, a second identification of a transmit beam for the monitored link, wherein said second identification is associated with said second BTPI.
11. The method of embodiment 10, further comprising transmitting, to said UE, one or more of control information and data using at least one of said first and second identified transmit beams.
12. A TRP configured to perform the method of any one of embodiments 1-11.
13. The TRP of embodiment 12, said TRP comprising at least one processor; and a memory, said memory comprising instructions executable by said at least one processor, whereby said TRP is configured to perform any one of embodiments 1 to 11.
14. A transmission point (TRP) for communicating with a user equipment (UE), comprising: a transmitting unit, configured to transmit, from said TRP to said UE, a first beam tracking process index (BTPI) associated with an active link between said TRP and said UE.

UE Side Embodiments

15. A method performed by a user equipment (UE) communicating with a transmission point (TRP), comprising: receiving, at said UE from said TRP, a first beam tracking process index (BTPI) associated with an active link between said TRP and said UE.
16. The method of embodiment 15, further comprising: receiving, at said UE from said TRP, a second BTPI associated with a monitored link between said TRP and said UE.
17. The method of embodiment 16, wherein said first BTPI is received in a message with one or more channel state reference signal (CSI-RS) configurations for said active link and said second BTPI is received in a message with one or more CSI-RS configurations for said monitored link.
18. The method of embodiment 16, further comprising: receiving, at said UE from said TRP, a message comprising a CSI-RS configuration and the first BTPI associated with the active link; and receiving, at said UE from said TRP, a message comprising a CSI-RS configuration and the second BTPI associated with the monitored link
19. The method of embodiment 17 or 18, further comprising: determining, based at least in part on said one or more CSI-RS configurations for said active link, a preferred transmit beam for said active link; transmitting, from said UE to said TRP, an identification of said preferred transmit beam for said active link; determining, based at least in part on said one or more CSI-RS configurations for said monitored link, a preferred transmit beam for said monitored link; and transmitting, from said UE to said TRP, an identification of said preferred transmit beam for said monitored link.
20. The method of embodiment 19, further comprising: determining, based at least in part on said one or more CSI-RS configurations for said active link, a set of one or more UE receive beam parameters for said active link; storing, in a memory of said UE and together with said first BTPI, said one or more UE receive beam parameters for said active link; determining, based at least in part on said one or more CSI-RS configurations for said monitored link, a set of one or more UE receive beam parameters for said monitored link; and storing, in said memory and together with said second BTPI, said one or more UE receive beam parameters for said monitored link.

21. The method of embodiment 20, wherein said stored UE receive beam parameters for said active link include one or more antenna weights, and wherein said stored UE receive beam parameters for said monitored link include one or more antenna weights.

22. The method of embodiment 21, wherein said antenna weights comprise one or more of amplitude and phase shift values.

23. The method of embodiment 20, where said stored UE receive beam parameters for said active link comprise one or more processing vectors and wherein said stored UE receive beam parameters for said monitored link comprise one or more processing vectors.

24. The method of any of embodiment 20 or 23, further comprising accessing said stored UE receive beam parameters for said active link using said first BTPI; receiving, at said UE from said TRP, one or more of control information and data on said preferred transmit beam for said active link using said accessed UE receive beam parameters for said active link; accessing said stored UE receive beam parameters for said monitored link using said second BTPI; and receiving, at said UE from said TRP, one or more of control information and data on said preferred transmit beam for said monitored link using said accessed UE receive beam parameters for said monitored link.

25. The method of any of embodiments 16-24, further comprising: receiving, at said UE from said TRP, a message comprising a third beam index, wherein said third beam index comprises an indicator indicating that said UE should not change a beam associated with either said active or monitored link between said TRP and said UE, performing a channel test based at least in part on said received message; and reporting to said TRP a result of said channel test without updating UE receive beam parameters for either of said active or monitored links.

26. The method of any previous embodiment, further comprising: receiving, at said UE from said TRP, first and second transmit beams associated with said beam tracking processes for said active link and said first BTPI, wherein said first transmit beam is a best known transmit beam; obtaining, from a memory of said UE using said first BTPI, a first beam quality value associated with said first transmit beam; determining a second beam quality value for said second transmit beam; comparing said first and second beam quality values; and updating one or more stored UE receive beam parameters based on said comparing.

27. The method of any previous embodiment, further comprising: receiving, at said UE from said TRP, at least one transmit beam associated with said beam tracking processes for said active link and said first BTPI; obtaining, from a memory of said UE using said first BTPI, beam quality information regarding a best known transmit beam; comparing at least one of said received transmit beams with said best known transmit beam based at least in part on said obtained beam quality information; and updating one or more stored UE receive parameters based on said comparing.

28. A UE configured to perform the method of any one of embodiments 15-27.

29. The UE of embodiment 28, said UE comprising at least one processor; and a memory, said memory comprising instructions executable by said at least one processor, whereby said UE is configured to perform any one of embodiments 15 to 27.

30. A user equipment (UE) for communicating with a transmission point (TRP), comprising: a receiving unit, configured to receive, at said UE from said TRP, a first beam tracking process index (BTPI) associated with an active link between said TRP and said UE.

Additional Disclosure:

The text that follows is the material from the appendix filed with U.S. Provisional Application No. 62/520,078, filed on Jun. 15, 2017, to which this application claims priority:

Introduction

In prior meetings, the following agreements have been made related to handling of multiple beam pair links (BPLs) and beam-related indication:

---

Agreement 1:

NR-PDCCH transmission supports robustness against beam pair link blocking
UE can be configured to monitor NR-PDCCH on M beam pair links simultaneously, where
M ≥ 1. Maximum value of M may depend at least on UE capability.
FFS: UE may choose at least one beam out of M for NR-PDCCH reception
UE can be configured to monitor NR-PDCCH on different beam pair link(s) in different NR-PDCCH OFDM symbols
. . .
Agreement 2:

Aim for low-overhead indication for spatial QCL assumption to assist UE-side beamforming/receiving
FFS details (e.g., tag-based where the tag refers to previous CSI-RS resources, BPL-based, referring to previous measurement reports, indication one resource (set) out of multiple resource (set)s configured by RRC, CSI-RS resource/port index based, etc.)
Agreement 3:

Indication of QCL between the antenna ports of two CSI-RS resources is supported.
By default, no QCL should be assumed between antenna ports of two CSI-RS resources.
Partial QCL parameters (e.g., only spatial QCL parameter at UE side) should be considered.
For downlink, NR supports CSI-RS reception with and without beam-related indication,
When beam-related indication is provided, information pertaining to UE-side beamforming/receiving procedure used for CSI-RS-based measurement can be indicated through QCL to UE -continued QCL information includes spatial parameter(s) for UE side reception of CSI-RS ports
FFS: information other than QCL
Agreement 4:

For reception of unicast DL data channel, support indication of spatial QCL assumption
between DL RS antenna port(s) and DMRS antenna port(s) of DL data channel:
Information indicating the RS antenna port(s) is indicated via DCI (downlink grants)
The information indicates the RS antenna port(s) which is QCL-ed with DMRS
antenna port(s)
FFS: Indication details
E.g. explicit indication of RS port/resource ID, or implicitly derived
. . .
Agreement 5:

. . .
Configuration of QCL for UE specific NR-PDCCH is by RRC and MAC-CE signalling
Note that MAC-CE is not always needed
FFS: necessity of DCI signalling
Note: For example, DL RS QCLed with DMRS of PDCCH for delay spread,
Doppler spread, Doppler shift, and average delay parameters, spatial parameters Discussion As discussed in a previous contribution, beam management can consist of a baseline procedure in which a single beam-pair link (BPL) is established, e.g., for short packet data sessions. For longer data sessions, an extended procedure may be invoked in which multiple BPLs are established. This can be beneficial, for example, to achieve PDCCH robustness whereby the gNB can transmit PDCCH on multiple BPLs simultaneously or in TDM fashion (see Agreement #1 above). Another example is the use of multiple BPLs for achieving high rank PDSCH transmission in multi-panel/multi-TRP deployments. In scenarios where multiple BPLs are established, some form of beam-related indication is needed to provide assistance to the UE in setting its Rx spatial filtering configuration(s) (which includes one or more of beamforming weights, antenna weights, precoding weights, precoding vector(s), etc.) to receive PDSCH/PDCCH. This is particularly important in the context of analog beamforming, for example, where the UE must apply the beamforming weights before it can receive the data and/or control signals. The beamforming weights are typically determined in one or more prior beam management measurement procedures based on CSI-RS.

Measurement Indicator (MI) Definition

While there have been several agreements made that include the term BPL, the term itself has not been formally defined. In a prior meeting, a proposal was made in a WF as follows: A BPL is defined by a UE or gNB measurement (e.g. RSRP/CSI) on a reference signal (e.g. CSI-RS, SS, SRS) transmitted/received according to a TX/RX spatial filtering configuration.

Despite multiple agreements containing the BPL term, there seems to be some resistance in RAN1 to the use of this wording. In our view the term itself is still useful for discussion purposes, even if it does not appear explicitly in specifications. To potentially alleviate some of the concerns, here we propose a more general term that we believe captures the key aspects that are needed for beam-related indication.

We observe that the key aspects are that the UE performs measurements on a set of DL reference signal resources and provides a measurement report indicating one or more preferred resources. Some form of indicator is then needed to refer back to the measurement and/or report when beam indication is used to assist UE-side beamforming for reception of PDSCH/PDCCH as well as to update/refine a particular BPL. Based on this observation we propose the following definition of a Measurement Indicator (MI):

Proposal 1: For beam management, a measurement indicator (MI) is supported in NR to enable reference to the following two items together: (1) UE or gNB measurement(s) (e.g., RSRP, CSI) on one or more reference signal resources (e.g., CSI-RS, SS, SRS) transmitted/received in one or more prior slots according to one or more spatial filtering configurations; and (2) an associated measurement report containing one or more indictors to the preferred reference signal resource(s), e.g., CRI, SRI, implicit indicator of an SS block. FFS: detailed format of MI.

Alternative proposal: For beam management, a measurement indicator (MI) (a.k.a., BTPI or TCI) is supported to enable reference to the spatial QCL properties of a previously received CSI-RS.

Maintenance of Multiple BPLs

During a given DL beam management procedure based on CSI-RS, a UE performs measurements on a set of beamformed CSI-RS resources, where the beamforming may be configured, for example, to sweep across a portion of the TRP coverage area. For a P2 procedure, the UE reports an index or identifier (CRI) corresponding to one or more preferred CSI-RS resources, as well as the corresponding measurement(s), e.g., RSRP or CSI parameters CQI, RI, PMI. The reported CRI(s) indicate the preferred gNB Tx beam(s) as seen from the UE perspective. For a P3 or joint P2/P3 procedure, the UE may also adapt its Rx spatial filtering configuration (beamforming weights) to find a preferred UE Rx beam corresponding to each one of the preferred gNB Tx beam(s).

Figure 8:
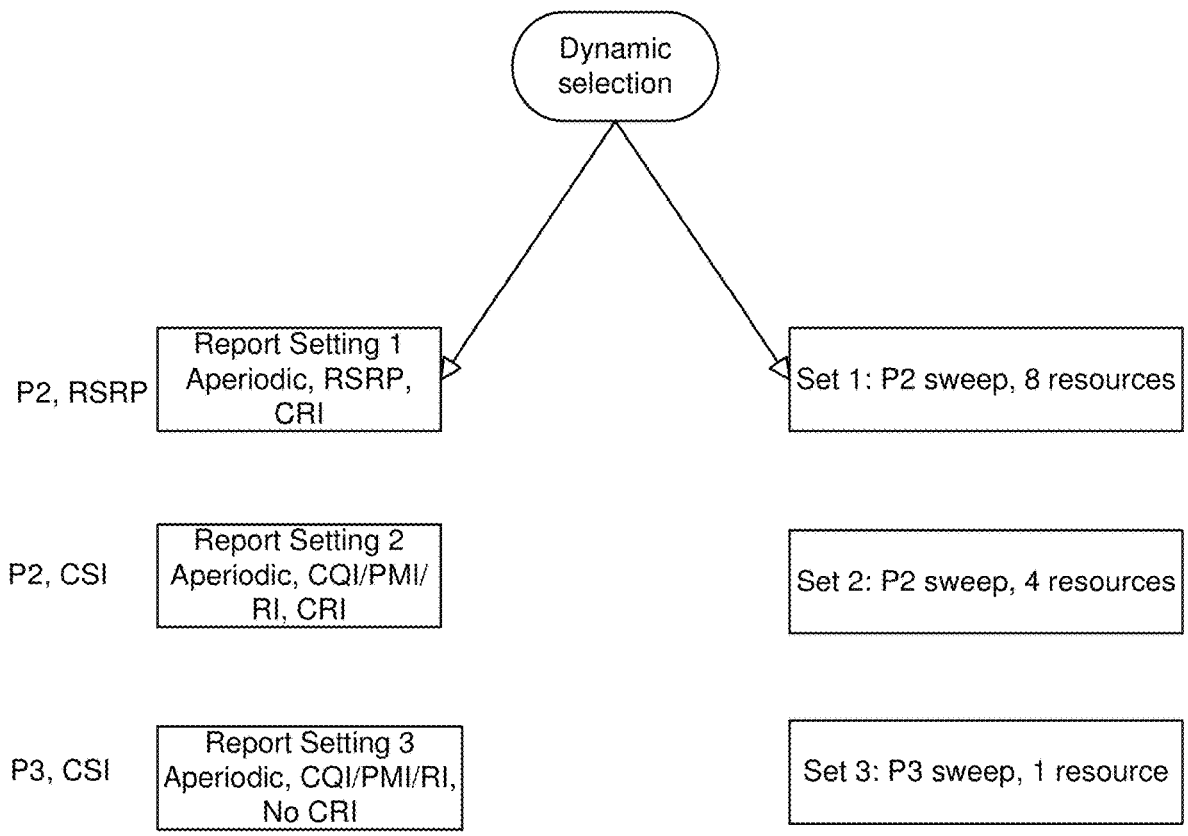
FIG. 8 shows an example setup for a configuration framework.

Configuration of measurement and reporting for beam management is handled in the agreed CSI/beam management framework. For discussion purposes, FIG. 8 shows an example setup for the configuration framework consisting of 3 different report settings corresponding to P2 and P3 procedures based on reporting of either RSRP or CSI. At any given time, the measurements are performed using one of 3 different resource sets defined within the resource setting. The various settings and sets are configured using RRC. Then, as agreed in the framework, report settings and resource sets are dynamically selected. For example, FIG. 8 shows Report Setting 1 being dynamically selected corresponding to an aperiodic P2 beam sweep in which the UE reports RSRP and one or more CRIs. In tandem, Resource Set 1 within Resource Setting 1 is dynamically selected and contains 8 CSI-RS resources for the P2 beam sweep.

The above framework may be used to establish and maintain multiple BPLs by triggering measurements and reports associated with each BPL separately, and appropriately keeping track of the preferred spatial filtering configurations associated with each BPL. For keeping track, the notion of measurement indicator (MI) is useful, where different values of the MI are associated with different BPLs. As we discuss below, each time a measurement is triggered on a set of CSI-RS resources for a particular BPL, MI is included in the triggering message. Since the number of maintained BPLs is likely to be fairly small, MI can be defined with low overhead, e.g., 2 bits, allowing for maintenance of up to 4 BPLs. Due to the low overhead, it is practical to include MI in DCI which can be the same DCI used for triggering at least aperiodic CSI measurement and reporting. Using MI for periodic CSI measurement and reporting is FFS.

When maintaining multiple BPLs, each time a measurement and report is triggered by the gNB, the gNB should associate a certain MI with the Tx spatial filtering configuration (Tx beam) corresponding to the CRI of the preferred CSI-RS resource reported by the UE. In addition, the UE should associate a certain MI with the Rx spatial filtering configuration (Rx beam) associated with the preferred CSI-RS resource. In this way, in the future, if the same MI is indicated to the UE in a scheduling DCI, it can retrieve the Rx spatial filtering configuration that it used to receive the previously transmitted CSI-RS resource from its memory. This indication can assist with UE-side beamforming to effectively receive another DL signal, i.e., PDSCH, PDCCH, or another set of CSI-RSs. Note that no absolute beam indices are required; MI functions as a relative reference to Tx and Rx beams.

In the case of a P2 beam sweep with MI=b, the gNB triggers measurement on a set of CSI-RS resources that are each beamformed differently. In this procedure, the UE holds its Rx beam constant while evaluating the multiple gNB Tx beams. In this case, the UE can look-up from memory what Rx spatial filtering configuration (Rx beam) is currently associated with MI=b. Since the UE should hold its Rx beam constant for P2, it may use the Rx beam retrieved from memory to receive the new set of CSI-RS resources. Essentially, the UE can assume that the new CSI-RS resources are spatially QCL with the preferred CSI-RS resource from the previous measurement and report corresponding to MI=b. As mentioned previously, to support up to 4 BPLs (b∈{0, 1, 2, 3}), only 2 bits are needed in the DCI message. This uniquely indicates the preferred CSI-RS resource transmitted the last time an update of the BPL associated with MI=b was updated.

Before the gNB schedules the P2 beam sweep, it can also look up from memory what Tx spatial filtering configuration (Tx beam) was associated with the UE reported CRI the last time the BPL associated with MI=b was updated. This can be useful, for example, to ensure that the current "best" Tx beam is included in the P2 beam sweep to be used as a comparison in case new, better beams are found. This is important if the UE measures and reports an absolute quantity such as RSRP.

In the case of a P3 beam sweep with MI=b, the gNB triggers a measurement on a set of one or more CSI-RS resources for which the gNB holds its Tx spatial filtering configuration (Tx beam) fixed. The Tx beam is the one already associated with MI=b. In this case, the UE needs to be informed in some manner that the gNB holds its Tx beam constant, thus allowing the UE to vary its Rx beam. Essentially, the UE cannot that the new CSI-RS resource(s) are spatially QCL with the preferred CSI-RS resource from the previous measurement and report corresponding to MI=b. This could be done, for example, through a separate [1 bit] flag to inform the UE whether or not this is a P3 beam sweep. It is FFS whether this flag should be signalled to the UE dynamically or configured through higher layers, e.g., within the report or resource setting corresponding to the P3 beam sweep (see FIG. 8). Either way, the UE should not assume that the new CSI-RS resources are spatially QCL with the preferred CSI-RS resource from the previous measurement and report corresponding to MI=b. If a new preferred Rx beam is found, the UE should update the Rx spatial filtering configuration associated with MI=b. Since the Tx beam remains fixed, there is no need for the gNB to associate an updated Tx spatial filtering configuration with MI=b, nor is there a need for the UE to report CRI. However, it is still beneficial for the UE to report the other CSI components (CQI, PMI, RI) to support link adaptation.

Proposal 2: NR supports dynamic indication of a measurement indicator (MI) in DCI when triggering measurement and reporting on a set of CSI-RS resources used for beam management purposes. The MI is a message field with length [2] bits.

This proposal enables beam management procedures to establish and maintain multiple BPLs between the gNB and a UE. In line with Agreements #2 and 3, signalling of the measurement indicator (MI) serves as a low overhead, beam-related indication approach to aid reception of CSI-RS. Implicitly it indicates QCL relationships between a set of current CSI-RSs and previously reported preferred CSI-RSs associated with each BPL.

Beam Indication for PDSCH

In a multi-BPL scenario, some form of beam-related indication is required to provide assistance to the UE in setting its Rx spatial filtering configuration to receive PDSCH. As stated in Agreement #4 above, the assistance to the UE is in the form of a spatial QCL assumption between PDSCH DMRS antenna port(s) and DL RS antenna port(s). For beam management based on CSI-RS, the DL RS in question is naturally CSI-RS, specifically a preferred CSI-RS resource that was measured and reported previously for a particular BPL.

Providing this assistance to the UE can be handled in a very simple and natural way by including the MI value in the scheduling DCI. To illustrate such operation, FIG. 9 expands on FIG. 8, where an example sequence of measurements is shown based on dynamically selecting different measurement reports from the framework. P2 and P3 beam sweeps corresponding to a $1^{st}$ BPL indicated by MI=1 are performed sequentially (green), followed by sequential P2 and P3 beam sweeps corresponding to a $2^{nd}$ BPL indicated by MI=2 (red). DL data is then scheduled for the UE with beam-related indication after the sequence of measurements is performed. In this example, scheduling DCI includes a field indicating MI=1. After receiving this MI, the UE may assume that the PDSCH DMRS is spatially QCL with the preferred CSI-RS resource(s) in the most recent measurement, where the trigger included MI=1. This means that the UE is able to receive the PDSCH using the same Rx spatial filtering configuration(s) as it used to receive the preferred CSI-RS resource in the most recent measurement corresponding to MI=1. In this sense, the MI may be viewed as a QCL proxy.

Proposal 3: NR supports beam-related indication for PDSCH transmission by including a measurement indicator (MI) in the scheduling DCI. The MI is a message field with length [2] bits.

Proposal 4: If the scheduling DCI contains a measurement indicator (MI), the UE may assume that the PDSCH DMRS is spatially QCL with the preferred CSI-RS resource from the most recent measurement associated with the measurement indicator.

Beam Indication for PDCCH

Agreement #5 above states that configuration of QCL for UE specific PDCCH is by RRC and MAC-CE signalling, and that MAC-CE is not always needed. Furthermore, it is FFS whether or not DCI signalling is needed. Here we argue that RRC alone may be sufficient.

As discussed in the previous section for PDSCH, each time the UE performs measurements associated with a certain MI value, it reports the preferred CRI(s) and updates the preferred UE spatial Rx filtering configuration(s) (e.g., analog Rx beam(s)) corresponding to the signalled MI value. In this way, the UE is prepared to select a receiver configuration for receiving PDSCH at a later point in time when beam-related indication based on the MI is signalled.

In the case of PDCCH, a similar reporting/update procedure may be used, except that dynamic (e.g., DCI or MAC-CE) beam-related indication may not needed, nor is it always feasible. With analog beamforming, the UE must apply its Rx beamforming weights in advance of receiving a signal. In the case of receiving a control signal, the UE cannot rely on the control signal itself for assistance in beamforming: this is a chicken-and-egg problem.

Instead, we propose to associate PDCCH with at least one value of the measurement indicator, i.e., to at least one BPL, for the purposes of PDCCH monitoring. The MI value that the UE shall assume for receiving PDCCH is configured by higher layers (RRC). Alternatively, it could be written into the specifications that in the case of PDCCH monitoring of only a single BPL, that MI=1 is always assumed. In this way, when the UE receives the PDCCH scheduling the PDSCH shown in FIG. 9, it can assume that the PDCCH DMRS is spatially QCL with the preferred CSI-RS resource in the most recent report corresponding to MI=1.

Note that PDCCH need not be associated with a single MI value. According to Agreement #1 above, M BPLs can be configured for PDCCH monitoring, either simultaneously or in a TDM fashion. In this case, the UE can be configured with M different MI values. Moreover, the MI values to which PDCCH is associated may be the same or different than the ones dynamically indicated for PDSCH reception. Different BPLs for PDCCH may be maintained, for example, if wider beam widths are used for PDCCH requiring fewer resources in a beam sweep. Alternatively, the beam sweeps for PDCCH may be performed within a different time domain granularity compared to PDSCH, thus motivating the use of different BPLs.

Proposal 5: Indication of the QCL assumption for reception of UE-specific PDCCH may be achieved by associating UE-specific PDCCH with one or more measurement indicators (MI) by RRC configuration alone, i.e., without dynamic indication (MAC-CE or DCI).

Proposal 6: For reception of PDCCH, the UE may assume that the PDCCH DMRS is spatially QCL with the preferred CSI-RS resource(s) from the most recent measurement report(s) associated with the configured measurement indicator(s).

Beam Indication for Beam Group Reporting

While much of the description in this contribution has focused on measurement and reporting on different beam pair links (BPLs) separately, the basic approach could also be extended to support beam group reporting in which measurements are performed on one or more sets of CSI-RS resources and multiple CRIs are included in a CSI reports. The multiple CRIs are grouped according to what gNB Tx beam(s) may be received simultaneously by the UE in a hypothetical high rank transmission. Since the proposed measurement indicator is general in the sense that it refers to a measurement on resources and reporting of preferred resources, it can equally well represent a group of Tx beam(s). However, some details still need further study. For example, if the more groups are reported than actually used by the gNB, additional signalling on top of MI may be required. Since the gains of such reporting, especially considering additional overhead are not clear, we propose the following as a first step.

Proposal 7: For beam management, NR supports dynamic signalling of a measurement indicator (MI) for the purposes of beam-related indication at least for the case where beam group reporting is not configured. FFS: beam-related indication for beam group reporting.

In conclusion, the following is proposed:

Proposal 1: For beam management, a measurement indicator (MI) is supported in NR to enable reference to the following two items together: (1) UE or gNB measurement(s) (e.g., RSRP, CSI) on one or more reference signal resources (e.g., CSI-RS, SS, SRS) transmitted/received in one or more prior slots according to one or more spatial filtering configurations; and (2) an associated measurement report containing one or more indictors to the preferred reference signal resource(s), e.g., CRI, SRI, implicit indicator of an SS block. FFS: detailed format of MI.

Proposal 2: NR supports dynamic indication of a measurement indicator (MI) in DCI when triggering measurement and reporting on a set of CSI-RS resources used for beam management purposes. The MI can be in the form of a message field with length [2] bits.

Proposal 3: NR supports beam-related indication for PDSCH transmission by including a measurement indicator (MI) in the scheduling DCI. The MI can be in the form of a message field with length [2] bits.

Proposal 4: If the scheduling DCI contains a measurement indicator (MI), the UE may assume that the PDSCH DMRS is spatially QCL with the preferred CSI-RS resource from the most recent measurement report associated with the measurement indicator.

Proposal 5: Indication of the QCL assumption for reception of UE-specific PDCCH may be achieved by associating UE-specific PDCCH with one or more measurement indicators (MI) by RRC configuration alone, i.e., without dynamic indication (MAC-CE or DCI).

Proposal 6: For reception of PDCCH, the UE may assume that the PDCCH DMRS is spatially QCL with the preferred CSI-RS resource(s) from the most recent measurement report(s) associated with the configured measurement indicator(s).

Proposal 7: For beam management, NR supports dynamic signalling of a measurement indicator (MI) for the purposes of beam-related indication at least for the case where beam group reporting is not configured. FFS: beam-related indication for beam group reporting.

REFERENCED

[1] R1-1702674, "DL beam management overview," Ericsson, RAN1#88, February 2017.

[2] R1-1702676, "On DL beam indication," Ericsson, RAN1#88, February 2017.
[3] R1-1706641, "WF on BPL definition," Nokia, RAN1#88b, April 2017.

While various embodiments of the present disclosure are described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a transmission point (TRP) for communicating with a user equipment (UE), the method comprising:
   transmitting, to the UE, a first message comprising multiple channel state reference signal (CSI-RS) configurations and a first beam tracking process index (BTPI) that identifies a first beam tracking process;
   transmitting, to the UE, a trigger message for triggering the UE to transmit to the TRP a measurement report with respect to a set of one or more CSI-RS resources of the CSI-configurations;
   receiving, from the UE, an identification of a preferred CSI-RS configuration determined by the UE;
   transmitting, to the UE, a control message including the BTPI; and
   using the BTPI, transmitting data to the UE.

2. The method of claim 1, wherein
   the first BTPI is associated with a first link between the TRP and the UE, and
   the first link between the TRP and the UE is an active link used for transmitting control data and/or payload data.

3. The method of claim 2, wherein
   the method further comprises transmitting, from the TRP to the UE, a second BTPI associated with a second link between the TRP and the UE.

4. The method of claim 3, wherein
   the second link between the TRP and the UE is a monitored link.

5. The method of claim 3, wherein
   transmitting the second BTPI comprises transmitting a second message comprising the second BTPI and one or more CSI-RS configurations.

6. The method of claim 1, wherein the control message is for scheduling a PDSCH transmission.

7. The method of claim 1, wherein the trigger message comprises the first BTPI.

8. The method of claim 1, further comprising:
   after transmitting the trigger message to the UE and before transmitting the control message to the UE, transmitting to the UE a message comprising the first BTPI, wherein
   the first BTPI is not included in the trigger message.

9. A transmission point (TRP) for communicating with a user equipment (UE), the TRP comprising:
   a transmitter;
   a receiver; and
   processing circuitry, wherein the TRP is configured to perform a method comprising:
   transmitting, to the UE, a first message comprising multiple channel state reference signal (CSI-RS) configurations and a first beam tracking process index (BTPI) that identifies a first beam tracking process;
   transmitting, to the UE, a trigger message for triggering the UE to transmit to the TRP a measurement report with respect to a set of one or more CSI-RS resources of the CSI-configurations;
   receiving, from the UE, an identification of a preferred CSI-RS configuration determined by the UE;
   transmitting, to the UE, a control message including the BTPI; and
   using the BTPI, transmitting data to the UE.

10. The TRP of claim 9, wherein
    the first BTPI is associated with a first link between the TRP and the UE, and
    the first link between the TRP and the UE is an active link used for transmitting control data and/or payload data.

11. A method performed by a user equipment (UE) communicating with a transmission point (TRP), the method comprising:
    receiving, from the TRP, a first message comprising multiple channel state reference signal (CSI-RS) configurations and a first beam tracking process index (BTPI) that identifies a first beam tracking process;
    receiving, from the TRP, a trigger message for triggering the UE to transmit to the TRP a measurement report with respect to a set of one or more CSI-RS resources of the CSI-configurations;
    determining a preferred CSI-RS configuration from the CSI-RS configurations;
    transmitting, to the TRP, an identification of the preferred CSI-RS configuration;
    receiving, from the TRP, a control message including the BTPI; and
    using the BTPI, receiving data from the TRP.

12. The method of claim 11, wherein the first BTPI is associated with a first link between the TRP and the UE and the first link between the TRP and the UE is an active link used for receiving control data and/or payload data.

13. The method of claim 12, further comprising:
    receiving, from the TRP, a second BTPI associated with a second link between the TRP and the UE.

14. The method of claim 13, wherein the second link between the TRP and the UE is a monitored link.

15. The method of claim 13, wherein receiving the second BTPI comprises receiving a second message comprising the second BTPI and one or more CSI-RS configurations.

16. The method of claim 12, further comprising:
    determining, based at least in part on the one or more CSI-RS configurations for the first link, a set of one or more UE receive beam parameters for the first link; and
    storing, in a memory of the UE and together with the first BTPI, the one or more UE receive beam parameters for the first link.

17. The method of claim 11, wherein
    the control message is for scheduling a PDSCH transmission.

18. The method of claim 11, wherein
    the trigger message comprises the first BTPI.

19. The method of claim 11, further comprising:
    after receiving the trigger message and before receiving the control message, receiving a message comprising the first BTPI, wherein
    the first BTPI is not included in the trigger message.

20. A user equipment (UE) for communicating with a transmission point (TRP), the UE comprising:
- a transmitter;
- a receiver; and
- processing circuitry, wherein the UE is configured to perform a method comprising:
- receiving, from the TRP, a first message comprising multiple channel state reference signal (CSI-RS) configurations and a first beam tracking process index (BTPI) that identifies a first beam tracking process;
- receiving, from the TRP, a trigger message for triggering the UE to transmit to the TRP a measurement report with respect to a set of one or more CSI-RS resources of the CSI-configurations;
- determining a preferred CSI-RS configuration from the CSI-RS configurations;
- transmitting, to the TRP, an identification of the preferred CSI-RS configuration;
- receiving, from the TRP, a control message including the BTPI; and
- using the BTPI, receiving data from the TRP.

\* \* \* \* \*

UNITED STATES PATENT AND TRADEMARK OFFICE
CERTIFICATE OF CORRECTION

PATENT NO. : 12,088,373 B2  
APPLICATION NO. : 17/329970  
DATED : September 10, 2024  
INVENTOR(S) : Grant et al.

Page 1 of 3

It is certified that error appears in the above-identified patent and that said Letters Patent is hereby corrected as shown below:

On the Title Page

At Page 2, in Item (56), under "FOREIGN PATENT DOCUMENTS", in Column 1, Line 2, delete "5/2015" and insert -- 5/2017 --, therefor.

At Page 2, in Item (56), under "OTHER PUBLICATIONS", in Column 2, Line 24, delete "TST-RAN" and insert -- TSG-RAN --, therefor.

In the Drawings

In Fig. 3, Sheet 3 of 10, delete "US" and insert -- UE --, therefor.

In Fig. 4, Sheet 4 of 10, in Step "408", Line 2, delete "link." and insert -- link --, therefor.

In Fig. 5A, Sheet 5 of 10, in Step "504", Line 2, delete "TRP the UE." and insert -- TRP and the UE --, therefor.

Figure 9:
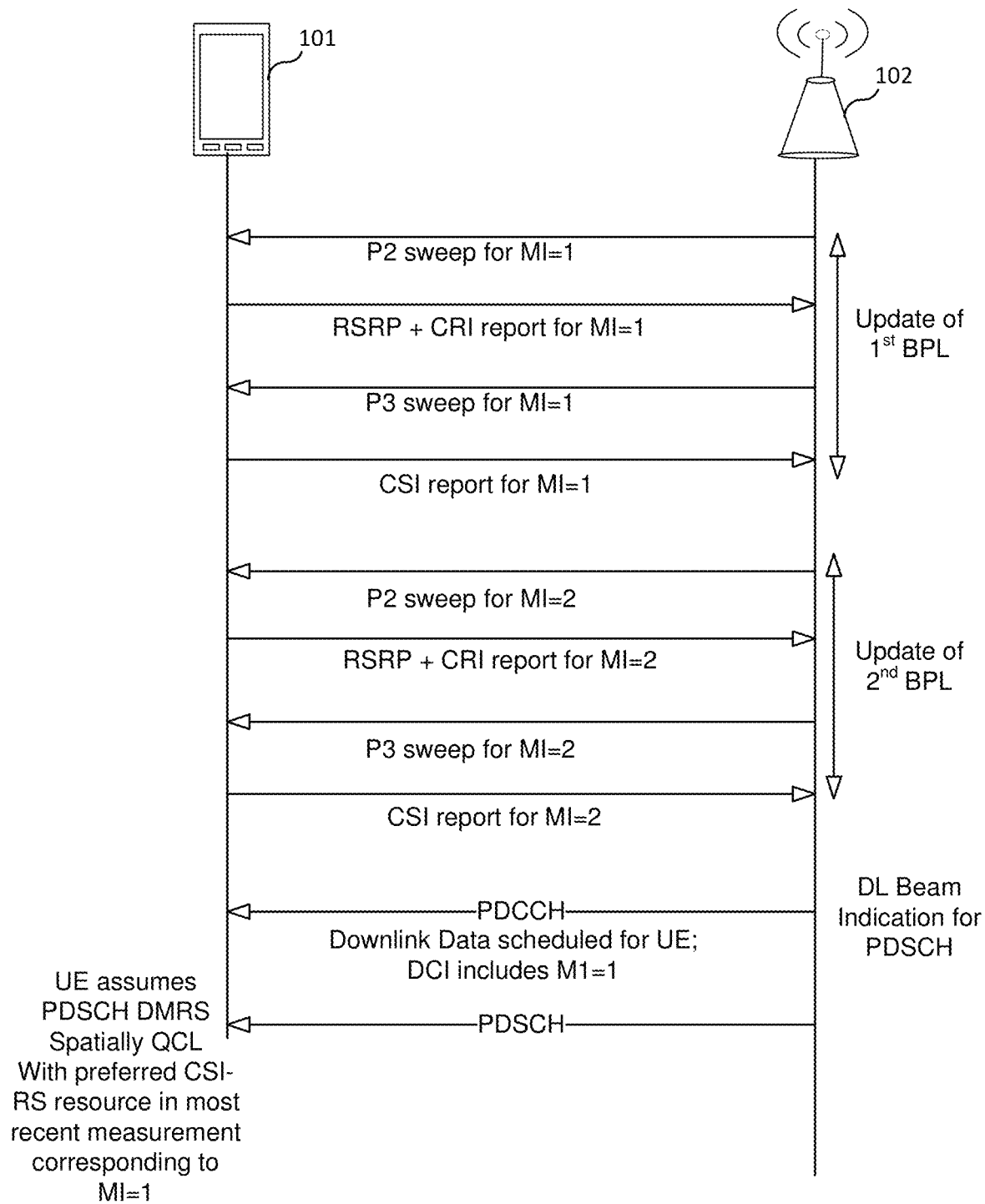
FIG. 9 is an example message flow diagram according to some embodiments.

In Fig. 9, Sheet 10 of 10, delete "M1=1" and insert -- MI=1 --, therefor.

In the Specification

In Column 1, Line 8, delete "(status pending)" and insert -- (now U.S. Pat. No. 11,038,570) --, therefor.

In Column 1, Line 13, delete "No." and insert -- Nos. --, therefor.

In Column 1, Line 47, delete "beam))." and insert -- beam). --, therefor.

In Column 2, Line 22, delete "channel state reference signal" and insert -- channel state information reference signal --, therefor.

Signed and Sealed this  
Eighteenth Day of February, 2025

Coke Morgan Stewart  
*Acting Director of the United States Patent and Trademark Office*

CERTIFICATE OF CORRECTION (continued)
U.S. Pat. No. 12,088,373 B2

In Column 3, Line 50, delete "channel state reference signal," and insert -- channel state information reference signal, --, therefor.

In Column 4, Line 34, delete "IE" and insert -- UE --, therefor.

In Column 4, Line 42, delete "an first" and insert -- a first --, therefor.

In Column 5, Lines 31-32, delete "to received," and insert -- to receive, --, therefor.

In Column 6, Line 30, delete "the that" and insert -- that --, therefor.

In Column 7, Line 53, delete "may better" and insert -- may be better --, therefor.

In Column 10, Line 45, delete "can be use" and insert -- can be used by --, therefor.

In Column 11, Line 4, delete "the after some" and insert -- after some --, therefor.

In Column 11, Line 10, delete "TPR" and insert -- TRP --, therefor.

In Column 11, Line 19, delete "BTIP" and insert -- BTPI --, therefor.

In Column 11, Lines 32-33, delete "and or" and insert -- and/or --, therefor.

In Column 11, Line 65, delete "one of" and insert -- of --, therefor.

In Column 12, Line 35, delete "TRP 102 the" and insert -- TRP 102 and the --, therefor.

In Column 12, Line 39, delete "and or" and insert -- and/or --, therefor.

In Column 15, Lines 29-30, delete "channel state reference signal" and insert -- channel state information reference signal --, therefor.

In Column 16, Line 33, delete "channel state reference signal" and insert -- channel state information reference signal --, therefor.

In Column 16, Line 43, delete "link" and insert -- link. --, therefor.

In Columns 19 & 20, in Table-continued, Line 17, delete "QCLed" and insert -- QCL-ed --, therefor.

In Column 20, Line 32, delete "indictors" and insert -- indicators --, therefor.

In Column 24, Line 32, delete "indictors" and insert -- indicators --, therefor.

In the Claims

In Column 25, Line 26, in Claim 1, delete "channel state reference signal" and insert -- channel state

CERTIFICATE OF CORRECTION (continued)
U.S. Pat. No. 12,088,373 B2 information reference signal --, therefor.

In Column 25, Line 32, in Claim 1, delete "CSI-configurations;" and insert -- CSI-RS configurations; --, therefor.

In Column 26, Line 4, in Claim 9, delete "channel state reference signal" and insert -- channel state information reference signal --, therefor.

In Column 26, Line 10, in Claim 9, delete "CSI-configurations;" and insert -- CSI-RS configurations; --, therefor.

In Column 26, Line 25, in Claim 11, delete "channel state reference signal" and insert -- channel state information reference signal --, therefor.

In Column 26, Line 31, in Claim 11, delete "CSI-configurations;" and insert -- CSI-RS configurations; --, therefor.

In Column 27, Line 8, in Claim 20, delete "channel state reference signal" and insert -- channel state information reference signal --, therefor.

In Column 27, Line 14, in Claim 20, delete "CSI-configurations;" and insert -- CSI-RS configurations; --, therefor.